(12) United States Patent
Wee et al.

(10) Patent No.: US 9,096,431 B2
(45) Date of Patent: Aug. 4, 2015

(54) NANOPARTICLE DECORATED NANOSTRUCTURED MATERIAL AS ELECTRODE MATERIAL AND METHOD FOR OBTAINING THE SAME

(75) Inventors: Tsyh Ying Grace Wee, Singapore (SG); Nopphawan Phonthammachai, Singapore (SG); Madhavi Srinivasan, Singapore (SG); Subodh Mhaisalkar, Singapore (SG); Yin Chiang Freddy Boey, Singapore (SG)

(73) Assignee: Nanyang Technological University, Singapore (SG)

( * ) Notice: Subject to any disclaimer, the term of this patent is extended or adjusted under 35 U.S.C. 154(b) by 733 days.

(21) Appl. No.: 13/062,897

(22) PCT Filed: Sep. 7, 2009

(86) PCT No.: PCT/SG2009/000318
§ 371 (c)(1),
(2), (4) Date: May 26, 2011

(87) PCT Pub. No.: WO2010/027336
PCT Pub. Date: Mar. 11, 2010

(65) Prior Publication Data
US 2011/0223480 A1    Sep. 15, 2011

Related U.S. Application Data

(60) Provisional application No. 61/095,090, filed on Sep. 8, 2008.

(51) Int. Cl.
*B82Y 30/00* (2011.01)
*B82Y 40/00* (2011.01)
(Continued)

(52) U.S. Cl.
CPC ........... *B82Y 30/00* (2013.01); *B82Y 40/00* (2013.01); *C01B 13/36* (2013.01);
(Continued)

(58) Field of Classification Search
CPC ........ B82Y 30/00; B82Y 40/00; C01B 13/36; C01B 31/0273; C01P 2002/72; C01P 2004/04; H01M 4/48
USPC ............... 429/218.1; 252/514, 518.1, 520.2
See application file for complete search history.

(56) References Cited

U.S. PATENT DOCUMENTS

| 2003/0152759 | A1 | 8/2003 | Chao et al. |
| 2006/0263291 | A1* | 11/2006 | Torardi ............... 423/608 |
| 2012/0021331 | A1* | 1/2012 | Zhu et al. ............. 429/483 |

FOREIGN PATENT DOCUMENTS

| EP | 2 027 916 A1 | 2/2009 |
| JP | 2005-138204 A | 6/2005 |

(Continued)

OTHER PUBLICATIONS
Search Report and Written Opinion for International Application No. PCT/SG2009/000318, completed Dec. 23, 2009.
(Continued)

*Primary Examiner* — Cynthia H Kelly
*Assistant Examiner* — Monique Wills
(74) *Attorney, Agent, or Firm* — Alston & Bird LLP

(57) ABSTRACT

The present invention refers to a nanostructured material comprising nanoparticles bound to its surface. The nanostructured material comprises nanoparticles which are bound to the surface, wherein the nanoparticles have a maximal dimension of about 20 nm. Furthermore, the nanostructured material comprises pores having a maximal dimension of between about 2 nm to about 5 μm. The nanoparticles bound on the surface of the nanostructured material are noble metal nanoparticles or metal oxide nanoparticles or mixtures thereof. The present invention also refers to a method of their manufacture and the use of these materials as electrode material.

39 Claims, 11 Drawing Sheets

(51) Int. Cl.
*C01B 13/36* (2006.01)
*C01B 31/02* (2006.01)
*H01G 11/36* (2013.01)
*H01G 11/46* (2013.01)
*H01M 4/48* (2010.01)
*H01G 11/04* (2013.01)

(52) U.S. Cl.
CPC ........... *C01B 31/0273* (2013.01); *H01G 11/36* (2013.01); *H01G 11/46* (2013.01); *C01P 2002/72* (2013.01); *C01P 2004/04* (2013.01); *C01P 2004/13* (2013.01); *C01P 2004/16* (2013.01); *C01P 2004/64* (2013.01); *H01G 11/04* (2013.01); *H01M 4/48* (2013.01); *Y02E 60/13* (2013.01); *Y10T 428/268* (2015.01)

(56) References Cited

FOREIGN PATENT DOCUMENTS

| | | | | |
|---|---|---|---|---|
| JP | 2006-282444 | A | 10/2006 | |
| JP | 2007-160151 | A | 6/2007 | |
| JP | 2007-242386 | A | 9/2007 | |
| WO | WO 02/075826 | A2 | 9/2002 | |
| WO | WO 03/060209 | A1 | 7/2003 | |
| WO | WO 03/084768 | A1 | 10/2003 | |
| WO | WO 2007/061945 | * | 5/2007 | ............ H01M 4/92 |
| WO | WO 2007/061945 | A2 | 5/2007 | |
| WO | WO 2009/070169 | A1 | 6/2009 | |

OTHER PUBLICATIONS

Barisci, J. N., et al.; "Electrochemical studies of single-wall cabon nanotubes in aqueous solutions"; J. Electroanal. Chem. 2000, 488, pp. 92-98.
Bekyarova, E., et al.; "Electronic Properties of Single-Walled Cabon Nanotube Networks"; J. Am. Chem. Soc. 2005, 127, pp. 5990-5995.
Che, G., et al.; "Carbon nanotubule membranes for electrochemical energy storage and production"; Nature 1998, 393, pp. 346-348.
Claye, A. S., et al.; "Solid-State Electrochemistry of the Li Single Wall Carbon Nanotube System"; J. Electrochem. Society 2000, 147, pp. 2845-2852.
Fang, Z., et al.; "Preparation and electrochemical property of three-phase gas-diffusion oxygen electrodes for metal air battery"; Electrochimica Acta 2006, 51, pp. 5654-5659.
Frackowiak, E., et al.; "Carbon materials for the electrochemical storage of energy in capacitors"; Carbon 2001, 39, pp. 937-950.
Fuhrer, M. S., et al.; "Crossed Nanotube Junctions"; Science 2000, 288, pp. 494-496.
Gamburzev, S., et al.; "Silver-carbon electrocatalyst for air cathodes in alkaline fuel cells"; J. Applied Electrochemistry 2002, 32, pp. 805-809.
Gong, K., et al.; "Polymer-Assisted Synthesis of Manganese Dioxide/Carbon Nanotube Nanocomposite with Excellent Electrocatalytic Activity toward Reduction of Oxygen"; J. Phys Chem. C 2007, 111, pp. 1882-1887.
Gruner, G.; "Carbon nanotube films for transparent and plastic electronics"; J. Mat. Chem. 2006, 16, pp. 3533-3539.
Hsieh, C. T., et al.; "Synthesis and electrochemical characterization of carbon nanotubes decorated with nickel nanoparticles for use as an electrochemical capacitor"; J. Solid State Electrochem 2008, pp. 663-666.
Hu, F. P., et al.; "Oxygen reduction on Ag-$MnO_2$/SWNT and Ag-$MnO_2$/AB electrodes"; Carbon 205, 43, pp. 2931-2936.
Huang, H., et al.; "Carbon nanotubes as a secondary support of a catalyst layer in a gas diffusion electrode for metal air batteries"; J. Colloid and Interface Science 2005, 284, pp. 593-599.
Jia, N., et al.; "Modification of carbon supported catalysts to improve performance in gas diffusion electrodes"; Electrochimica Acta 2001, 46, pp. 2863-2869.
Jorissen, J.; "Bifunctional oxygen/air electrodes"; Power Sources, 2006, 155; pp. 23-32.
Kaempgen, M., et al.; "Bifunctional carbon nanotube networks for supercapacitors"; Appl. Phys. Lett. 2007, 90, 264104; 3 pages.
Kauffman, D. R., et al.; "Chemically Induced Potential Barriers at the Carbon Nanotube—Metal Nanoparticle Interface"; Nano Lett. 2007, pp. 1863-1868.
Kiebele, A., et al.; "Carbon nanotube based battery architecture"; Applied Physics Letters 2007, 91, 144104; 3 pages.
Kiebele, A., et al.; "Printed Energy and Power Storage: Batteries and Supercapacitors"; Nanotechnology Law & Business, 2008, vol. 5 No. 1, pp. 7-16.
Liu, C.G., et al.; "Single-walled carbon nanotubes modified by electrochemical treatment for application in electrochemical capacitors"; J. Power Sources 2006 160, pp. 758-760.
Naimer, N., et al.; "Zinc-air batteries for UAVs and MAVs"; Electric Fuel Corporation Report, 2002; pp. 1-4.
Ng, S. H., et al.; "Single wall carbon nanotube paper as anode for lithium-ion battery"; Electrochem Acta 2005, 51, pp. 23-28.
Niu, C., et al.; "High power electrochemical capacitors based on carbon nanotube electrodes"; Appl. Phys. Lett. 1997, 70, pp. 1480-1482.
Pandolfo, A.G., et al.; "Carbon properties and their role in supercapacitors"; J. Power Sources 2006, 157, pp. 11-27.
Shiraishi, S., et al.; "Electric double layer capacitance of highly pure single-walled carbon nanotubes (HiPco™ Buckytubes™) in propylene carbonate electrolytes"; Electrochem Comm. 2002, pp. 593-598.
Wang, J., et al.; "Capacitance properties of single wall carbon nanotube/polypyrrole composite films"; Composites Sceince and Technology 2007, pp. 2981-2985.
Yang, Y., et al.; "Particle size effects for oxygen reduction on dispersed silver + carbon electrodes in alkaline solution"; J. Electroanalytical Chemistry 1995, 397, pp. 271-278.
Wu, C-Y., et al.; "Silver-Carbon Nanocapsule Electrocatalyst for Oxygen Reduction Reaction"; Journal of the Electrochemical Society 2007, 154, pp. B1059-B1062.
Zhang, G. Q., et al.; "A new air electrode based on carbon nanotubes and Ag-$MnO_2$ for metal air electrochemical cells"; Carbon 2004, 42, pp. 3097-3102.
"NREL: Advanced Vehicles and Fuels Research—Energy Storage" National Renewable Energy Laboratory [online]; Retrieved from the Internet <URL: http://www.nrel.gov/vehiclesandfuels/energystorage/; 1 page.
Office Action for Japanese Application No. 2011-526015; dated May 14, 2013.

\* cited by examiner

NANOPARTICLE DECORATED NANOSTRUCTURED MATERIAL AS ELECTRODE MATERIAL AND METHOD FOR OBTAINING THE SAME

CROSS-REFERENCE TO RELATED APPLICATIONS

This application claims the benefit of priority of U.S. provisional application No. 61/095,090, filed Sep. 8, 2008, the contents of each being hereby incorporated by reference in its entirety for all purposes.

FIELD OF THE INVENTION

The present invention refers to the field of electrochemistry, in particular to the electrochemistry of electrochemical capacitors.

BACKGROUND OF THE INVENTION

Electrochemical capacitors also referred to as supercapacitors or ultracapacitors, with power densities (~10 kW/kg) an order of magnitude higher than conventional secondary batteries represent an important segment of charge storage devices. In addition to the excellent energy and power densities, supercapacitors also offer advantages of very high charge-discharge rates and long cycle-life (>$10^4$ cycles compared with <$10^3$ cycles for lithium batteries) making them an attractive choice for applications ranging from high-load electric automotive solutions to photovoltaic systems for an integrated green-energy harnessing and storage application. While conventional supercapacitors comprise metallic charge collectors and amorphous-carbon enabled electrical double layer (EDL); carbon nanotubes (CNTs) have been explored as electrode materials for supercapacitors and Li-ion batteries due to their high electrical/thermal conductivity, chemical stability, low mass density and large surface area. Incorporation of the CNT network as a single-layer current collector and active material has lead to a light-weight, flexible charge storage device that also offers the opportunity for a roll-to-roll printing process. This 'printed power' solution now addresses a critical gap in the deployment of printed electronics with printed supercapacitors potentially integrated with applications such as radio frequency identification tags (RFIDs), wearable electronics, and backplanes for large-area displays amongst others.

However, it is recognized that the device internal resistance attributed to an electrode-electrolyte or inter-tube (CNT-CNT) contact resistance amongst others, may limit the power density and charge-discharge capability of supercapacitors. Known strategies to overcome this contact resistance may include coating with conducting polymers or nano structured materials including amorphous carbon.

Thus, a need exists to provide suitable electrode materials for supercapacitors and other energy charge storage devices which overcome at least some of the problems referred to above.

SUMMARY OF THE INVENTION

In a first aspect, the present invention refers to a nanostructured material comprising nanoparticles bound to its surface. The nanostructured material comprises nanoparticles which are bound to the surface, wherein the nanoparticles have a maximal dimension of about 20 nm. Furthermore, the nano structured material comprises pores having a maximal dimension of between about 2 nm to about 5 µm. The nanoparticles bound on the surface of the nanostructured material can be noble metal nanoparticles or metal oxide nanoparticles or mixtures thereof. Those materials are also referred to herein as nanoparticle decorated nanostructured material.

In another aspect the present invention refers to a method of manufacturing a nanoparticle decorated nanostructured material. The method comprises mixing of a porous nanostructured material with a solution comprising a noble metal nanoparticle precursor or a metal oxide nanoparticle precursor to obtain a suspension of the nanostructured material with the solution comprising the noble metal nanoparticle precursor or the metal oxide nanoparticle precursor. In a further step the method includes the step of chemically reducing the noble metal nanoparticle precursor or the metal oxide nanoparticle precursor to allow precipitation of the nanoparticles at the surface of the nanostructured material at a temperature of equal or less than 80° C.

The present invention also refers to a nanoparticle decorated nanostructured material obtained by a method described herein.

The present invention further refers to the use of a nanoparticle decorated nanostructured material for the manufacture of an electrode.

BRIEF DESCRIPTION OF THE DRAWINGS

The invention will be better understood with reference to the detailed description when considered in conjunction with the non-limiting examples and the accompanying drawings, in which:

As shown in FIG. 1, a nanostructured material comprising linkers which are bound on its surface is mixed with a solution comprising metal particle precursor(s). In a step of chemically reducing the precursor at temperatures ≤80° C. the nanoparticle form and precipitate on the surface of the nanostructured material by binding to the linker.

FIG. 4(a) shows a schematic representation of the experimental cell assembly of a supercapacitor using silver decorated carbon nanotubes for the second electrode material and carbon nanotubes as the first electrode (CNT/Ag-CNT network). FIG. 4(b) shows CNTs decorated with Ag nanoparticles (Ag-CNT) having a diameter about 13 nm (scale bar 100 nm); FIG. 4(c) shows Ag-CNT with Ag nanoparticle diameter of about 4 nm (scale bar 100 nm). FIG. 4(d) shows a high resolution TEM image of 4 nm Ag-CNT (scale bar 5 nm) while FIG. 4(e) shows cyclic voltammograms for CNT supercapacitors with 13 nm Ag-CNT electrodes, 7 nm Ag-CNT electrodes, 4 nm Ag-CNT electrodes, 1 nm Ag-CNT electrodes and 2% Ag mixed with CNT (Ag+CNT) electrodes. FIG. 4(f) shows the galvanostatic charge-discharge curves for the corresponding supercapacitors.

FIG. 16: MnO$_2$ nanowires; FIG. 17: MnO$_2$ powder).

FIGS. 18 and 19 shows that the nanoflowers are indeed consisting of MnO$_2$ phase. FIG. 18 is a qualitative evidence indicating the formation of MnO$_2$. The results of FIG. 19 were obtained using Rietveld refinement. Rietveld refinement is a quantitative crystallographic analysis of MnO$_2$ structure. The exact composition of the crystalline powder can be extracted from Rietveld refinement.

DETAILED DESCRIPTION OF THE PRESENT INVENTION

Figure 1:
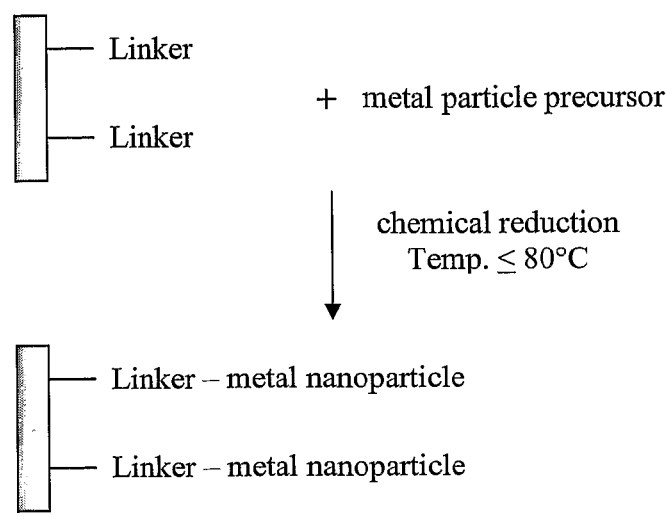
FIG. 1 discloses the general principal of the method of manufacturing a nanoparticle decorated nanostructured material.

In a first aspect the present invention refers to a nanostructured material comprising nanoparticles bound to its surface. Such material of nanoparticles bound to the surface of the nanostructured material is also referred herein as decorated or metal nanoparticle decorated nanostructured material. All nanoparticles bound to the surface have a maximal dimension of about 20 nm. The nanostructured material comprises pores having a maximal dimension of between about 2 nm to about 5 µm and the nanoparticles include but are not limited to noble metal nanoparticles, metal oxide nanoparticles or mixtures thereof.

Decorated nanostructured materials are demonstrated to be effective bi-functional charge collectors and electrode materials for devices such as for electrochemical capacitors and batteries. Devices comprising decorated nanostructured materials show an enhanced energy density and power density.

The nanoparticles can be made of a noble metal. Noble metals include silver, palladium, gold, platinum, iridium, osmium, rhodium and ruthenium. In one embodiment silver, palladium, gold, platinum, mixtures thereof or alloys thereof can be used. Examples of noble metal alloys include alloys of platinum and iridium, Pd—Pt, Pd—Rh, Pd—Pt—Rh, silver or gold together with calcium, to name only a few. Alloys of noble metals are used for example to obtain erosion-resistant electrode materials.

In another embodiment, the nanoparticles can be made of a transition metal oxide or an aluminium oxide. Examples of such oxides include, but are not limited to PtO$_2$, V$_2$O$_3$, V$_2$O$_5$, Nb$_2$O$_5$, NiO$_2$.xH$_2$O, LiCoO$_2$, LiFeO$_2$, LiMn$_2$O$_3$, Li$_2$MoO$_4$, Li$_2$TiO$_3$, MnO$_2$, Ag—MnO$_2$, Al$_2$O$_3$, MoO$_3$, TiO$_2$, SiO$_2$, ZnO$_2$, SnO$_2$, Fe$_2$O$_3$, NiO, Co$_3$O$_4$, CoO, Nb$_2$O$_5$, W$_2$O$_3$, mixtures and alloys thereof. The metal oxide can be either stoichiometric or non-stoichiometric (e.g. Me$_{n-x}$O$_{m-y}$, 0<x<1; 0<y<1≤n≤3; 1≤m≤5).

It was demonstrated herein that decorated nanostructured materials with nanoparticles have a size of between about 0.5 nm to about 20 nm are most suitable as electrode material for different devices, such as supercapacitors, sensors, hybrid electrochemical devices, lithium-ion battery or metal-air batteries, such as Zn-air batteries.

Since the dimension of a nanoparticle is not always regular, i.e. perfectly spherical, the above size refers to the maximal dimension of the nanoparticle in any direction. In other embodiments, the size of the nanoparticles is between about 0.5 to 15 nm, or about 0.5 to 12, or about 0.5 to 5 nm, or about 5 nm to about 12 nm, or about 5 to about 15 nm, or about 0.5 to 13 nm.

Furthermore, in one embodiment, the method described herein allows to manufacture nanoparticles which have a very narrow size distribution. Thus, in one embodiment, the nanoparticle size distribution for nanoparticles with a size of between about ≥12 to 20 nm is about ±5. The nanoparticle size distribution for nanoparticles with a size of between about ≥5 to <12 nm is about ±3 nm. The nanoparticle size distribution for nanoparticles with a size of between about 2 to <5 nm is about ±1 nm. For example, a silver nanoparticle with a size of 1 nm is estimated to consist of about 31 silver atoms. Smaller nanoparticles have the advantage of not blocking the pores of the nanostructured material and thus do not decrease the surface area of the nanostructured material. A high surface area can increase the capacitance of the decorated nanostructured material.

Thus, depending on the size of the nanoparticles, the pores of the nanostructured material are either macropores or mesopores. According to IUPAC definition, macropores are considered pores with a size of between about >50 nm to about 5 µm while mesopores have a size of between about 2 nm to about 50 nm. Due to the porous structure the nanostructured material has a high surface area. Nanostructured materials can be characterized by a large surface area which can be at least about 50 m$^2$/g. In one embodiment the surface area of the nanostructured material is about 100, or 200 or 300 m$^2$/g.

The nanostructured material can be manufactured of any material which can be used in the applications referred to herein. For example, the nanostructured material can be made of a carbon material, a ceramic, glass, such as soda-lime glass, borosilicate glass, acrylic glass, isinglass (Muscovy-glass), aluminium oxynitride, a metal, such as titanium; a metal oxide, a polypyrrole or mixtures of nanostructured materials made of different of the aforementioned materials, to name only a few. In one embodiment, the nanostructured material is made of a carbon material. Examples of carbon materials include, but are not limited to activated carbon, carbon black and graphene. In one example, the nanostructured material is made of $TiO_2$, such as $TiO_2$ nanotubes while in another example carbon nanotubes, such as single-walled carbon nanotubes (SWCNT) are used.

Nanostructured material refers to a material with dimensions in the nanometer range. In one embodiment, at least one dimension of the nanostructured material is less than 100 nm. In another embodiment, a nanostructured material has a dimension typically ranging from 1 to 100 nm (where 10 angstrom=1 nm=1/1000 micrometer). Nanostructured materials can be classified into the following dimensional types:
Zero dimensional (0D): nanospherical particles. (also called nanoparticles);
One dimensional (1D): nanorods, nanowires (also called nanofibers) and nanotubes; and
Two dimensional (2D): nanoflakes, nanoflowers, nanodiscs and nanofilms.

The nanostructure of the nanostructured material can include, but is not limited to a nanotube, a nanoflower, a nanowire (also called nanofiber), a nanoflake, a nanoparticle, a nanodisc, a nanofilm and combinations of the aforementioned nanostructures (e.g. a mixture of nanotubes and nanowires).

The nanotubes can be single-walled (SWNT) or double-walled (DWNT) or multi-wall nanotubes (MWNT). A single-wall nanotube can be defined by a cylindrical sheet with a diameter of about 0.7 to about 10 or 20 nm or with a diameter of <20 or <2 nm. They can be several micrometer long, i.e. at least 1 µm or at least 2 µm or between about 1 µm and 5 µm. Double-wall or multi-wall nanotubes consist of numerous cylinders tightly stuck into another.

In one embodiment the nanotubes are made of carbon and can be used as single-wall carbon nanotubes (SWCNT), double-wall carbon nanotubes (DWCNT) or multi-wall carbon nanotubes (MWCNT). Single-wall carbon nanotubes can be described as a graphite plane (so called graphene) sheet rolled into a hollow cylindrical shape so that the structure is one-dimensional with axial symmetry, and in general exhibiting a spiral conformation, called chirality.

For example, the use of carbon nanotubes as electrode material can provide a high electrical conductivity of at least or about 2000 S/cm, which is important for electron transport. In addition, thin layers of carbon nanotubes can be formed as transparent electrode and thus provide transparency in visible and infrared wavelength range. At the same time layers of carbon nanotubes provide good mechanical and thermal properties and can be manufactured to be flexible. Carbon nanotubes are also solution processable and are thus compatible with printing techniques for fabrication.

The nanoparticles bound to the surface of the nanostructured material are chemically bound or fixed to the nanostructured material via a linker. A linker is a molecule connecting the surface of the nanostructured material with the nanoparticle. A linker includes a functional group such as a hydroxyl group, a pyrene, an ester, a thiol, an amine or a carboxyl group. It is also possible that mixtures of different linkers of the aforementioned group are used to bind nanoparticles to the surface of the nanostructured material. Examples of suitable linkers can include, but are not limited to porphyrine (including amine groups) or polyethylene glycol (PEG; also known as poly(ethylene oxide)) (including —OH groups).

Figure 3:
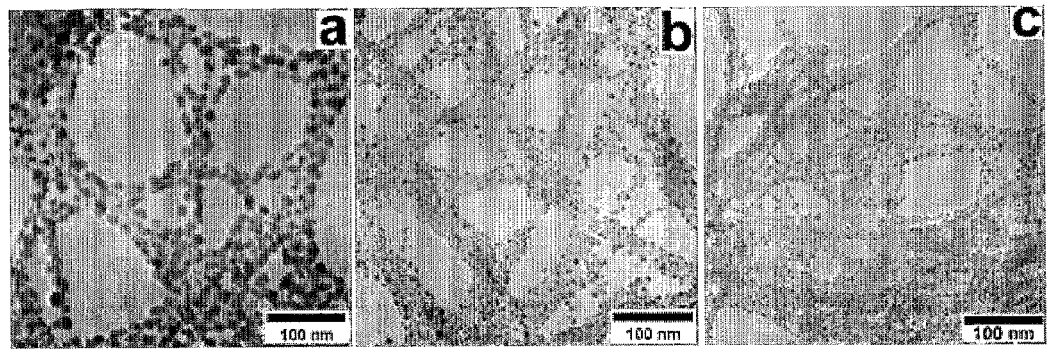
FIG. 3 shows TEM images of Ag-CNT (silver decorated carbon nanotubes) with Ag nanoparticle sizes of (a) about 13 nm (b) about 4 nm and (c) about 3 nm. The images in FIGS. 3(a) and 3(b) are the same as in FIGS. 4(b) and 4(c). (scale bar 100 nm)
Figure 7:
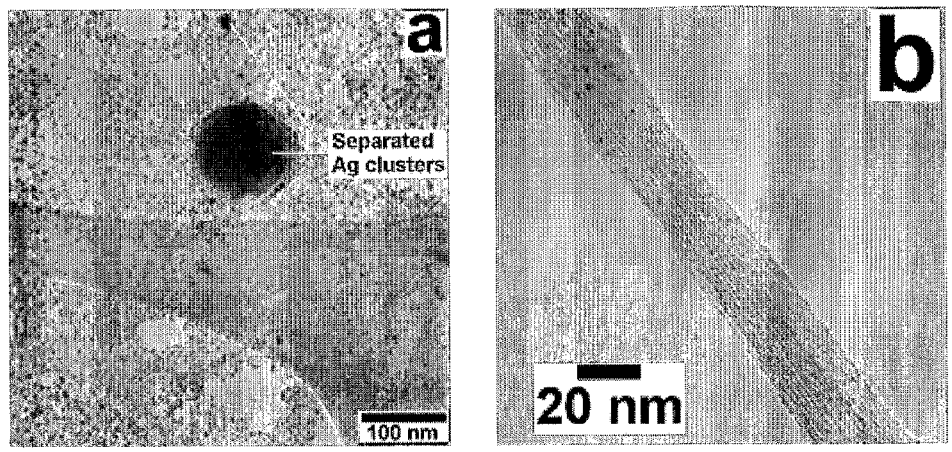
FIG. 7 shows the effect of a varying metal precursor concentration (in this case AgNO$_3$) to the silver decoration of the nanostructured material. (a) Large colloidal silver clusters formation at 0.15 M (Ag-CNT6) and (b) Average size 1 nm at 0.05 M (AgCNT2).

In one embodiment, the carboxyl group can be comprised in a linker including, but not limited to formic acid, acetic acid, propionic acid, butanoic acid, pentanoic acid, hexanoic acid, cycloalkane carboxylic acids or benzoic acid. One example includes 4-aminobenzoic acid. Furthermore, the hydroxyl group can be comprised in a linker including, but not limited to phosphoric acid or sulfonic acid. Using such linkers to connect the nanoparticles to the surface of the nanostructured material can enhance the device energy density while reducing the internal resistance. Further improvement can be obtained in case the nanoparticles are evenly distributed at the surface of the nanostructured material such as shown for example in FIG. 3. Evenly distributed also means that the nanoparticles do not form separate clusters as shown in FIG. 7(a). Therefore, in one embodiment, the nanoparticles are evenly distributed at the surface of the nanostructured material. In one embodiment, between about 5% to about 80% of the surface of the nanostructured material is covered with nanoparticles. In another embodiment at least 30% or 40% or 50% or 60% are covered with nanoparticles.

In one embodiment, silver decorated single walled carbon nanotubes are used. In other embodiments $MnO_2$ decorated $MnO_2$ nanoflakes, nanowires or nanoflowers are used.

The decorated nanostructured material described above can be formed into a membrane which can be used as electrode material. It can be used for example as electrode material for a supercapacitor, a sensor, a hybrid electrochemical device, a rechargeable battery, such as a lithium ion batter or a metal air battery, such as a zinc air battery.

Electrochemical capacitors (ECs) often called as "supercapacitors" are electrical devices with highly reversible charge storage and delivery capabilities. Whereas a regular capacitor consists of conductive foils and a dry separator, the supercapacitor crosses into battery technology by using special electrodes and an electrolyte. Electrochemical capacitors differ from batteries in that they do not store energy in redox reactions that occur in the electrode structure. Electrochemical capacitors store energy through electrostatic interactions that occur in the electrode and electrolyte interface region, also known as the double layer. ECs have properties complementary to secondary batteries. Such an EC can be composed of electrode based on the decorated nanostructure material referred to herein and an electrolyte. ECs can employ both aqueous and non-aqueous electrolytes in either liquid or solid state.

Described herein is a supercapacitor comprising a decorated nanostructured material. The decorated nanostructured material can be used for one electrode or both electrodes of the supercapacitor. In one embodiment silver decorated carbon nanotubes are used as electrode material.

A hybrid electrochemical device is a hybrid electrochemical capacitor (HEC) in which one electrode is from a battery (typically Li-ion battery) and the other from a supercapacitor. The electrode of the capacitor can be made of a decorated nanostructured material referred to herein.

A rechargeable battery comprises two electrodes between which an electrolyte is arranged. The electrolyte can be a liquid electrolyte or a gel-like polyelectrolyte. Examples for rechargeable batteries include mercury, nickel-cadmium, nickel-iron, nickel-hydrogen, nickel-metal hydride, nickel-zinc, lithium-ion, lithium-manganese, lithium-polymer, lithium-iron-phosphate, lithium-sulfur, lithium-titanate, or silver-zinc battery, to name only a few examples. For example, lithium ion batteries are commonly used in consumer electronics, such as for portable electronics with one of the best energy-to-weight ratios, no memory effect and a slow loss of charge when not in use. The electrodes of a lithium-ion battery are made of lightweight lithium and carbon. The carbon electrode can be replaced by a decorated nanostructured material referred to herein.

The decorated nanostructured material can also be used in metal air batteries. Metal/air batteries are characterized by a high energy density, a flat discharge voltage and long shelf life. In metal/air batteries, the reactive anode and air electrode result in an inexhaustible cathode reactant. Ampere-hour capacity in the anode, as well as the handling and storage of reaction products determines capacity limit. There are primary, reserve, and both electrically and mechanically rechargeable metal/air batteries. While the mechanically rechargeable battery is much like a primary battery, the electrically rechargeable type needs a third or bifunctional electrode for oxygen evolution. Examples of metal air batteries include, but are not limited to zinc-air batteries, lithium-air batteries and aluminium-air batteries.

Like lithium-ion batteries, metal-air batteries normally also use an electrode made of carbonaceous material. This carbon electrode can be replaced by a decorated nanostructured material referred to herein.

For example, the cathode of a zinc-air battery can be composed of a decorated nanostructured material referred to herein. This cathode is in direct electrical contact with the electrolyte layer. The anode is a zinc anode which is separated from the cathode via the electrolyte layer thus forming a flexible zinc-air battery.

In another aspect, the present invention refers to a method of manufacturing a (nanoparticle) decorated nanostructured material. The method comprises in a first step mixing of a porous nanostructured material with a solution comprising a noble metal nanoparticle precursor or a metal oxide nanoparticle precursor to obtain a suspension of the nanostructured material with the solution comprising the noble metal nanoparticle precursor or the metal oxide nanoparticle precursor. In a further step, the noble metal nanoparticle precursor and/or the metal oxide nanoparticle precursor is chemically reduced to allow precipitation of the nanoparticles at the surface of the nanostructured material at a temperature of equal or less than 80° C. FIG. 1 illustrates an embodiment of this method.

In one embodiment in which a noble metal nanoparticle precursor is used the temperature for the chemical reduction step is below 60° C. or below 50° C. In another embodiment, the temperature is between about 15° C. to about 30° C. or between about 15° C. to 25° C. or is about 0° C., 5° C., 10° C., 15° C., 20° C., 25° C., 30° C., 35° C., 40° C., 45° C., 50° C., 55° C. or below 60° C. As referred to above, smaller sizes for the nanoparticles are of particular advantage. Thus, the reaction conditions for the above method are adapted such as to form nanoparticles with a maximal dimension or size of about 20 nm, or size of between about 0.5 nm to about 20 nm or any other size referred to herein.

One option to adapt the reaction conditions such as to form nanoparticles with the indicated sizes is to adapt the concentration of the noble metal nanoparticle precursor or metal oxide nanoparticle precursor in the suspension, i.e. in the mixture of nanostructured material and noble metal nanoparticle precursor or metal oxide nanoparticle precursor. In general, the concentration of precursor materials can be in the range of between about 0.001 M to about 1 M. In one embodiment, the concentration range of noble metal precursor material is in the range of between about 0.01 M to about 1 M, while in another embodiment the concentration range of the metal oxide precursor material can be in the range of between about 0.001 M to about 0.1 M.

The chemical reduction can be achieved by any one of the following methods. Chemical reduction can be achieved for example by adjusting the pH in the suspension comprising the nanostructured material and the noble metal nanoparticle precursor or metal oxide nanoparticle precursor. Another method of chemical reduction is by heating the suspension in a reducing atmosphere, such as heating in an 5% $H_2/N_2$ or 5% $H_2/Ar$ atmosphere at a temperature <500° C. for 4 to 8 hours; or by using a chemical reducing agent, such as sodium borohydride ($NaBH_4$) or other metal hydrides, such as $CaH_2$ or $MgH_2$.

In one embodiment the pH of the suspension comprising the nanostructured material and the noble metal nanoparticle precursor or metal oxide nanoparticle precursor is adapted to allow chemical reduction of the nanoparticle precursor by adapting the pH to be in a range of between about 1 to 10, or 3 to 10, or 4 to 10. In another embodiment, the pH can be in a range of between about 1 to 7.5 and 1 to 10. For example, in case of using a silver nanoparticle precursor material the pH is adjusted or adapted to be in a range of between about 4 to 8 or between about 4.3 to <7.3. In another example in which a gold nanoparticle precursor is used, the pH is adjusted to be in a range of between about 3 to 10, or 3.5 to 10, or 4 to 10. In case of using a platinum nanoparticle precursor the pH is adjusted to be in a range of between about 4 to 10 or between about 4 to 9. In case of using a metal oxide nanoparticle precursor, such as a manganese nanoparticle precursor, the pH is adjusted to be in a range of between about 1 to 7. Thus, in case of adjusting the pH chemical reduction is achieved by using a reducing agent, such as an acid or a base. Examples include, but are not limited to NaOH, $NH_3$, HCl, $HClO_4$, $H_2SO_4$ to name only a few. In general, any known acid or base can be used to adjust the pH of the suspension.

The reaction time or incubation time of the nanostructure material with the nanoparticle precursor also influences the size of the nanoparticles formed. In general the reaction time is between about 5 or 10 or 15 minutes to about 120 minutes. In another embodiment, the reaction time is between about 15 minutes to about 60 minutes.

A further factor which can influence the size of the nanoparticles formed is the concentration of the nanoparticle precursor in the starting solution before mixing with the nanostructured material. In one embodiment, the concentration of the nanoparticle precursor is between about 3 mM to about 150 mM, or at least 3 mM, or between about 3 mM to about 6.5 or 6.3 mM, or between about 3 mM to about 100 mM or below 150 mM. The method described herein allows manufacturing decorated nanostructured material wherein the nanoparticles bound to the surface of the nanostructured material have a narrow size range as already outlined further above.

Nanoparticle precursor materials for the above materials are known in the art. Different examples of precursor materials include metal chlorides, such as noble metal chlorides; metal nitrates, such as noble metal nitrates, metallic alkoxides, organometallic precursors, or metal acetates, to name only a few. Examples of noble metal nanoparticle precursor and metal oxide nanoparticle precursor include, but are not limited to $AgNO_3$, $[Ag(NH_3)_2]^+$ (aq), $AuCl_3$, $HAuCl_4.3H_2O$, $H_2PtCl_6.6H_2O$, $H_2PdCl_6.6H_2O$, $Mn(NO_3)_2$, or $KMnO_4$. For example, precursor for $TiO_2$ nanoparticles can be metallic alkoxides or organometallic precursors. Examples of titanium alkoxides can include, but are not limited to titanium methoxide, titanium ethoxide, titanium isopropoxide, titanium propoxide and titanium butoxide.

In general, the molar ratio of metal nanoparticle precursor to nanostructured material can be in the range of between about 0.05 to about 0.6 or between about 0.1 to about 0.55. In one embodiment, the molar ratio of a noble metal nanoparticle precursor, such as silver nanoparticle precursor, to nanostructured material is between 0.18 to about 0.54. In another embodiment, the molar ratio of metal oxide nanoparticle precursor to nanostructured material is between about 0.1 to about 0.5.

Before being mixed with the nanoparticle precursor, the nanostructured material is dispersed in a solvent appropriate for the respective nanostructured material at a concentration of between about 0.1 to about 1 mg/ml. Such solvents are known in the art. For example, carbon nanostructured materials or $MnO_2$ nanostructured materials can be easily dissolved in an aqueous solution, e.g. water. Other suitable solvents which can be used herein include alcohols, such as ethanol, isopropanol; ethylene glycol and acetone.

Nanostructured material which is used in the method referred to herein should comprise a linker immobilized at its surface. Nanostructured materials, such as carbon nanotubes, which do not comprise such linkers or only in a very small amount can be subjected to a treatment for introducing linkers which are immobilized on the surface of the nanostructured material. Nanostructured which do not comprise linkers or only in a very small amount are called "pristine" nanostructured materials.

Such treatments for introducing linkers are known in the art and can comprise for example exposition of the nanostructured material to an oxidative treatment, or sintering at temperatures <500° C., or refluxing in inorganic polar solvents, or plasma treatment, such as $N_2$ or $H_2$ or $O_2$ plasma treatment. In another embodiment, the nanostructured material, such as carbon nanotubes, is subjected to a treatment using irradiation with gamma-rays and subsequent contacting of the gamma-irradiated nanostructured material with an unsaturated carboxylic acid. The gamma-rays can create free radicals at the surface of the nanostructured material which readily reacts with the unsaturated carboxylic acid to form a linker molecule immobilized or bound on the surface of the nanostructured material.

The unsaturated carboxylic acid can be an unsaturated carboxylic acid or derivatives thereof. To avoid that the distance between the nanoparticle and the nanostructured material is too great, the unsaturated carboxylic acid forming the linker molecule comprises equal or less than 12 C-atoms.

In one embodiment, the unsaturated carboxylic acid is an acrylic acid or derivatives thereof. Examples of acrylic acids or derivatives thereof which can be used include, but are not limited to acrylic acid, methacrylic acid, methyl methacrylic acid, ethacrylic acid, alpha-chloroacrylic acid, alpha-cyano acrylic acid, beta methyl-acrylic acid (crotonic acid), alpha-phenyl acrylic acid, sorbic acid, alpha-chloro sorbic acid, angelic acid, cinnamic acid, p-chloro cinnamic acid, itaconic acid, citraconic acid, mesaconic acid, glutaconic acid, aconitic acid, maleic acid, fumaric acid, or tricarboxy ethylene.

Figure 2:
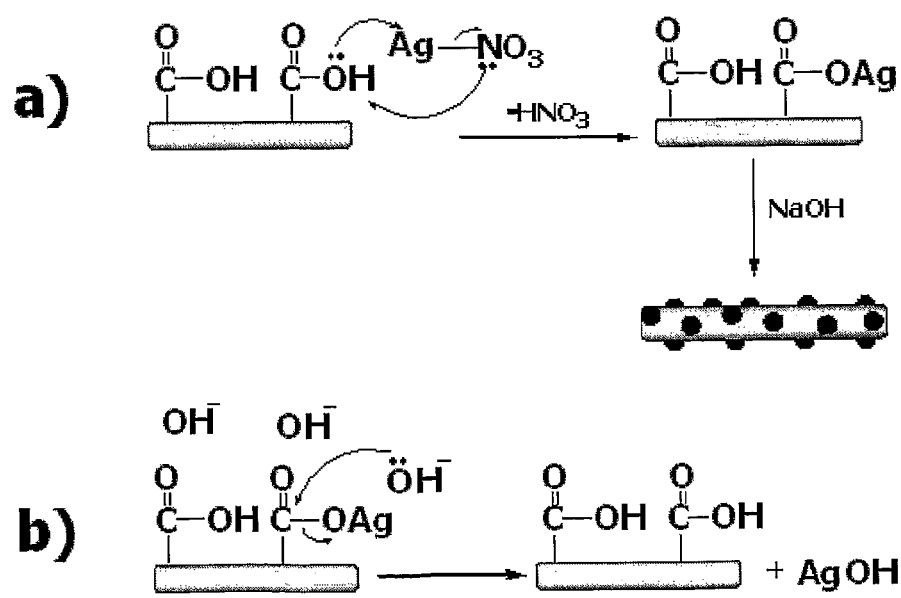
FIG. 2 shows proposed reaction mechanisms for (a) the deposition of silver nanocrystals at carboxyl group of SWCNTs and (b) the resolution of silver hydroxide from SWCNTs surfaces at high pH.

The nanoparticles which form during chemical reduction bind to the linker during precipitation as illustrated for example in FIG. 2. In the embodiment illustrated in FIG. 2, $AgNO_3$ is used as noble metal nanoparticle precursor which is chemically reduced using $HNO_3$ thus forming Ag which binds to the nanostructured material via the carboxyl group of the linker. In another embodiment $KMnO_4$ is used as metal oxide nanoparticle precursor which is reduced to $MnO_2$ nanoparticles and which also binds to the nanostructured material via a linker.

To manufacture a membrane made of the decorated nanostructured material referred to herein the decorated nanostructured material can be washed and afterwards be sieved through a filtration membrane. Afterwards, the membrane formed of the decorated nanostructured material can be peeled of the filter membrane as free-standing membrane and may be directly used as electrode material. It is also possible to mix the decorated nanostructured material with other components which are to be used in the electrode material before sieving it through a filtration membrane to obtain the electrode material. For example, the decorated nanostructured material can be mixed with untreated and/or unoxidized nanostructured material. Unoxidized or pristine nanostructured material refers to material which has not been subjected to a pre-treatment (such as oxidative treatment, sintering, refluxing or plasma treatment as referred to above).

In another aspect, the present invention refers to a nanoparticle decorated nanostructured material obtained by a method referred to herein or an electrode membrane manufactured by a method referred to herein. The nanoparticle decorated nanostructured material can be used to manufacture an electrode, such as an electrode for a supercapacitor; or a sensor; or a hybrid electrochemical device; or a rechargeable battery; or a metal-air battery. For example, in an application for a sensor, decorated nanostructured material could be used as the sensor or sensing material of the sensor.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

1. Synthesis of Metal Decorated Single Walled Carbon Nanotubes 1.1 Silver decorated single walled carbon nanotubes. To prepare silver nanoparticles decorated single-walled carbon nanotube, 0.08 g of single-walled carbon nanotubes (P3-SWCNTs, Carbon Solution Inc.) were dispersed in 15 mL of deionized water followed by 20 min ultrasonic treatment (120 kW). The dispersion of silver nanoparticles was controlled through pH adjustment (4.3<pH<7.3) using 0.1 M NaOH (99%, Merck) that was added to a 100 mL aliquots of $AgNO_3$ (99.99%, Aldrich) (0.1-0.15 M). The molar ratio of the silver nanoparticle precursor to the CNTs should be in the range of 0.18 to 0.54. The SWCNTs suspension was mixed with the pH adjusted $AgNO_3$ solution and stirred vigorously. The Ag-decorated SWCNTs were separated from the mother liquor by centrifugation (15,000 rpm, 10 min), after that excess Na-ion and nitrate were removed by multiple washing with deionized water. The final product was then redispersed in deionized water before use.

1.2 Gold decorated single walled carbon nanotubes. Gold stock solutions were prepared by adding 0.1 M NaOH (Sigma-Aldrich) dropwise to 20 ml of 3.0-6.3 mM $HAuCl_4$ ($HAuCl_4.3H_2O$, Alfa Aesar) (4.5 mM in this example) until the pH stabilized at predetermined values ranging from 4 to 10. SWCNTs suspension (0.08 g in 15 mL of deionized water) was dispersed in the solution comprising the gold precursor (molar ratio of gold precursor to SWCNTs should be 0.1 to 0.55). The pH in the solution after mixing the SWCNTs with the gold precursor is about 3.5. The resulting mixture was aged at 75° C. with vigorous stirring for 30 min after which the gold loaded catalysts were collected by filtration and washed repeatedly with deionized water to remove chloride.

1.3 Platinum decorated single walled carbon nanotubes. The solution of $H_2PtCl_6.6H_2O$ (3.0-6.3 mM, Aldrich, 5 mM in this example) in deionized water was adjusted to the desirable pH (4-9). SWCNTs suspension (0.08 g in 15 mL of deionized water) was dispersed in the Pt precursor solution (molar ratio of Pt precursor to SWCNTs should be 0.1 to 0.55) followed by the addition of methanol (Merck) as a reductant. The suspension was aged at 75° C. for 40 min and washed several times with deionized water.

1.4a Synthesis of $MnO_2$ Nanoflakes

Figure 5:
FIG. 5 shows a TEM image of $MnO_2$ nanoflakes obtained by a method described herein and which were bound on the surface of a nanostructured material. Scale bar 100 nm.

Solution A containing 0.2 g of manganese nitrate $Mn(NO_3)_2$ dissolved in 10 mL of distilled water was added under vigorous stirring to Solution B containing 0.5 g of $KMnO_4$ in 10 mL of distilled water. The resultant solution was stirred for 2 h and then transferred in to a Teflon® lined stainless steel autoclave and placed in the oven at temperatures 140-170° C. for 1-24 h to obtain the product which was washed several times with distilled water until the pH of the solution was 7. This was air dried in an oven at 100° C. for 24 h. Nanoflakes obtained by this method are shown in the TEM image of FIG. 5.

1.4b Synthesis of $MnO_2$ Nanoflowers and Nanowires

Figure 13:
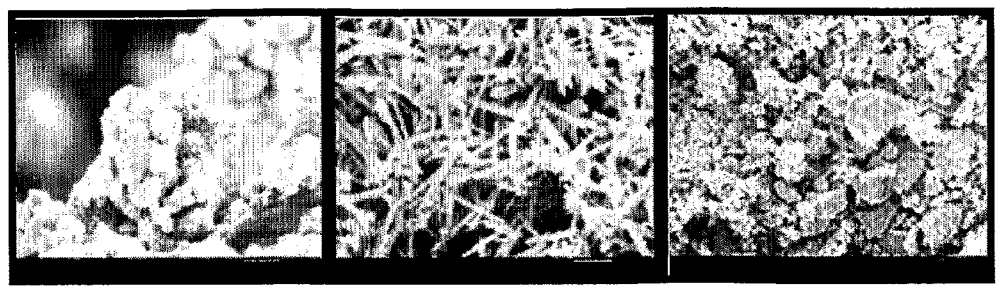
FIG. 13 shows SEM images of MnO$_2$ nanoflowers (left image), MnO$_2$ nanowires (central image) and MnO$_2$ powder (right image) obtained by a method described herein. (scale bars in all images 1 µm)

Aqueous solutions of $MnSO_4$ (8 mg/ml) and $KMnO_4$ (20 mg/ml) were mixed and transferred to a Teflon-lined stainless steel autoclave. The autoclave was then loaded into an oven preheated to 140° C. The dwell time for the reaction was varied from 1 to 18 hours in order to optimize the material for electrochemical applications. By heating the well mixed solution of $MnSO_4$ and $MnSO_4$ for 1 hour, $MnO_2$ nanoflowers are formed as shown in FIG. 13 (left image). Increasing the hydrothermal reaction time further to 18 hours, large amount of individual nanowires are formed as shown in FIG. 13 (central image). The diameter of $MnO_2$ nanowires is about 80 to about 150 nm and the length is more than 1 micrometer. After the dwell time at 140° C. the autoclave was cooled to room temperature naturally. The formed brownish black precipitate was filtered and washed with de-ionized (DI) water to remove any unreacted starting material and the soluble byproducts produced during reaction. The precipitate was dried at 100° C. in air and $MnO_2$ nanoflowers/nanorods were ready for collection after 1 hour. FIG. 13 (right image) shows SEM images of commercially available $MnO_2$ powder with particle size of 2 to 3.5 μm.

Figure 15:
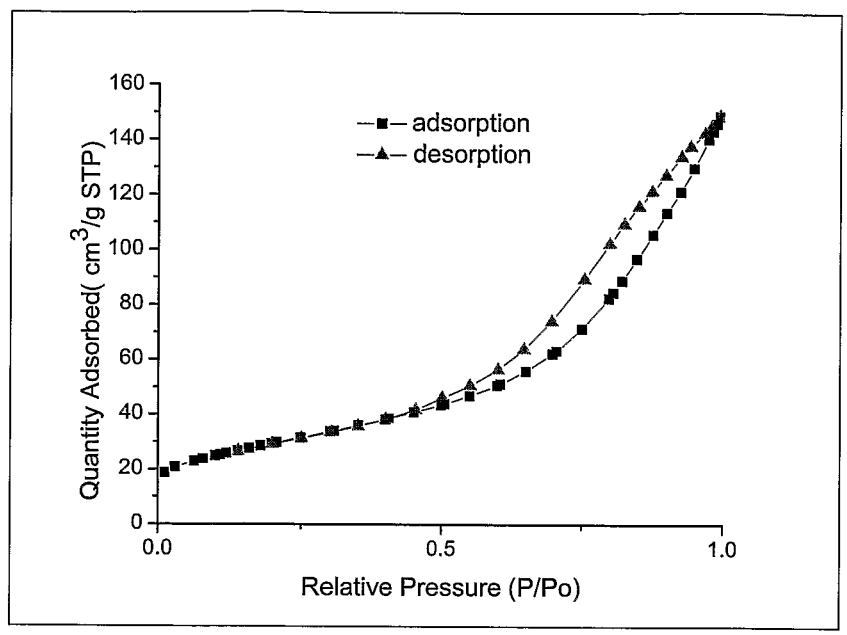
FIGS. 15 to 17 show the measurement of the BET surface area of different nanostructures of MnO$_2$ and MnO$_2$ powder (FIG. 15: MnO$_2$ nanoflower.
Figure 16:
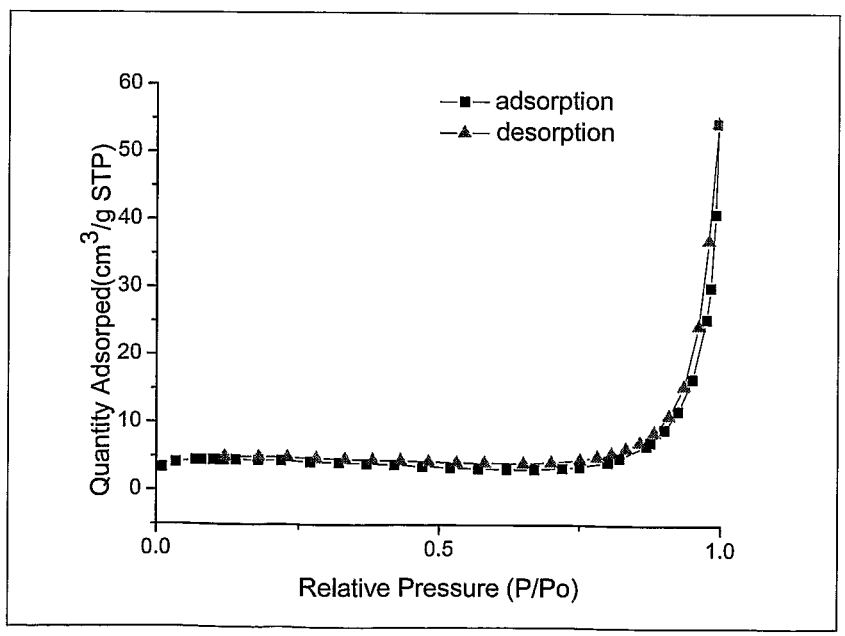
Figure 17:
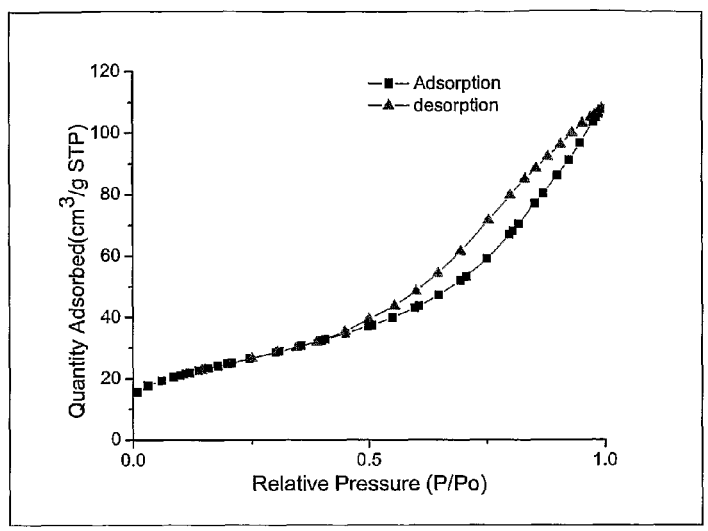
Figure 18:
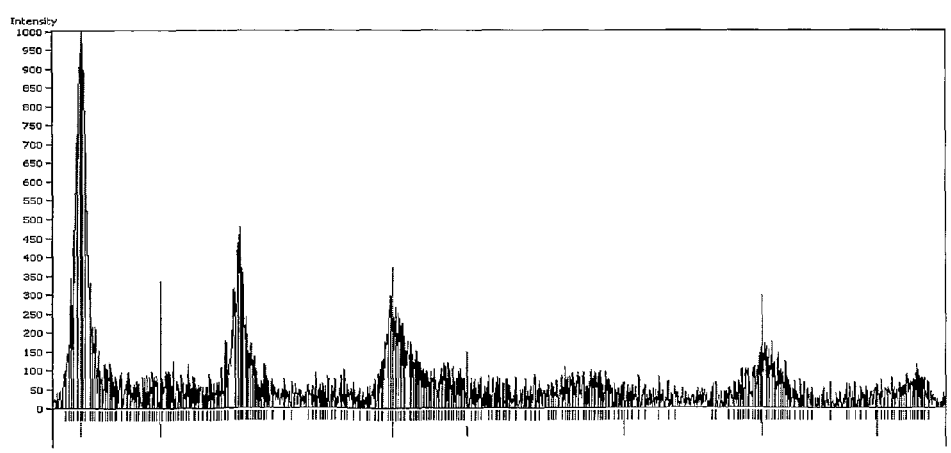
FIGS. 18 and 19 show XRD patterns collected for MnO$_2$ nanoflowers (FIG. 18) and MnO$_2$ nanowires (FIG. 19).
Figure 19:
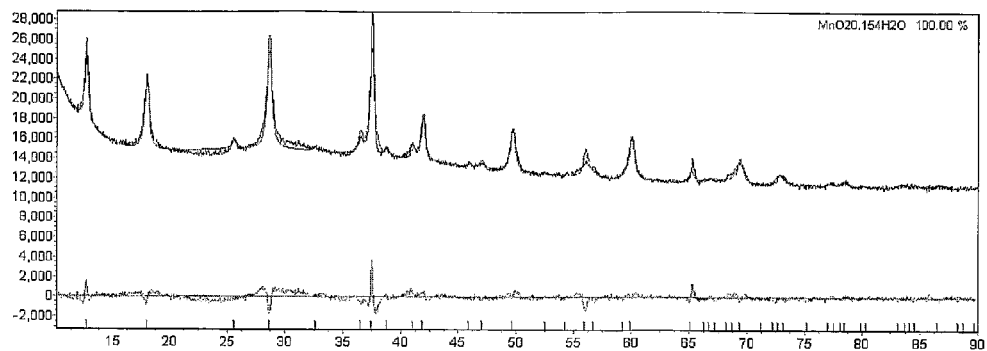

FIGS. 15 to 17 show the measurement of the BET surface area of different nanostructures of $MnO_2$. FIG. 15 shows the results of the BET surface measurement of $MnO_2$ nanoflowers. FIG. 16 shows the results of the BET surface measurement of $MnO_2$ nanowires. FIG. 17 shows the results of the BET surface measurement of $MnO_2$ powder. The following Table 1 summarizes the results obtained from these measurements.

TABLE 1

| BET surface area ($m^2/g$) of $MnO_2$ nanostructures and $MnO_2$ powder | | | |
|---|---|---|---|
| | $MnO_2$ nanoflower | $MnO_2$ nanowires | $MnO_2$ powder |
| BET surface area($m^2/g$) | 106 | 13 | 91 |

1.5 $MnO_2$ Decorated Single Wall Nanotubes (SWCNT)

Solution A containing 0.2 g -0.5 g of manganese nitrate $Mn(NO_3)_2$ or manganese acetate dissolved in 10 mL to 20 mL of distilled water was added under vigorous stirring to Solution B containing 0.5 g-0.9 g of $KMnO_4$ in 10 mL to 20 mL of distilled water. 0.05 to 0.2 g of SWCNT was dispersed in the solution under stirring and heating at 50-80° C. The pH was controlled from 1-7 using 0.01 M HCl or 0.01 to 0.05 M $HNO_3$ (depending on the pH the $MnO_2$ particle size/dispersity varies). The resulting suspension after stirring for 1-2 h is centrifuged, washed with distilled water and dried in an oven at 100° C. for 24 h.

Figure 14:
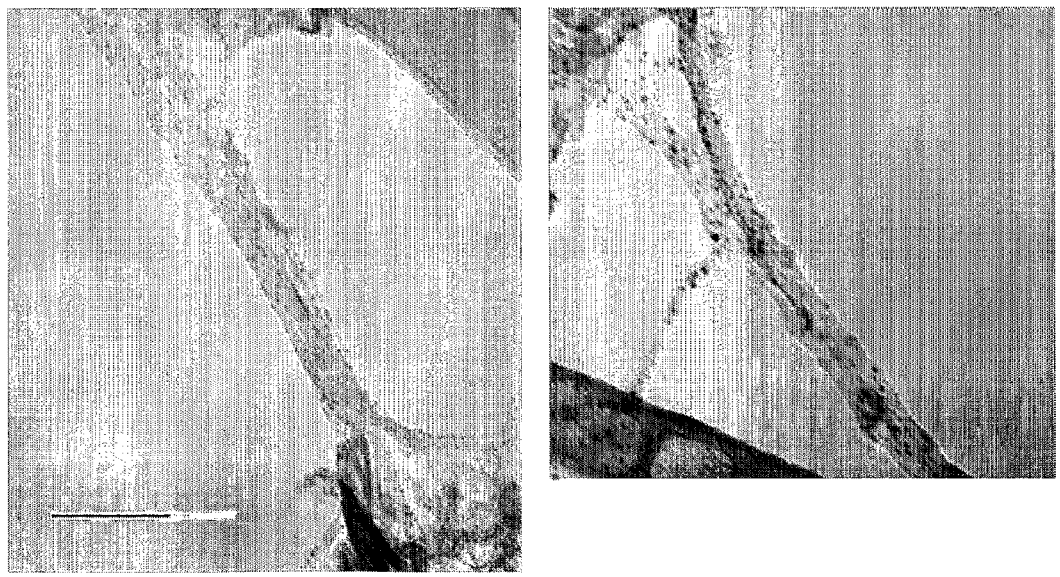
FIG. 14 shows TEM images of single walled carbon nanotubes which have MnO$_2$ nanoparticles bound to their surface. The average size of the nanoparticles is between about 1 to 10 nm. (left and right image show the same structure but the magnification is different; scale bar left image 100 nm, scale bar right image 20 nm).
Figure 20:
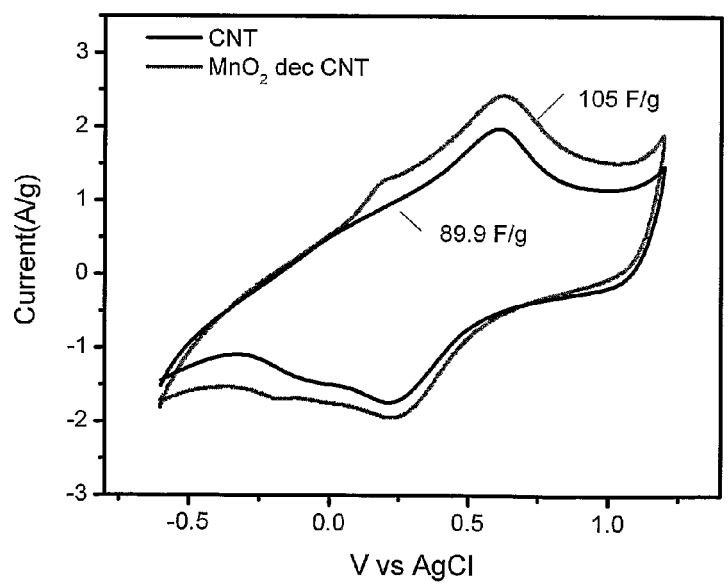
FIG. 20 shows cyclic voltammograms for supercapacitors with CNT and MnO$_2$ decorated CNT electrode measured at 20 mVs$^{-1}$, which the MnO$_2$ decorated CNT has a slightly higher capacitance of 105 F/g as compared to CNT electrode (~90 F/g).

In an alternative approach for the manufacture of $MnO_2$ decorated nanostructures, 10 mg of single walled carbon nanotubes were dissolved in 100 ml distilled water and were mixed for about 30 minutes using sonification of the solution. Afterwards, samples of the solution were then added to a solution of $KMnO_4$ (40 mg of $KMnO_4$ in 200 ml of $H_2O$). The resulting mixture was stirred for 3 days at pH 8.5 at a temperature of about 70° C. During the reaction the purple color of the $KMnO_4$ solution disappeared as oxidation takes place. At the end of the 3 day incubation the solution is filtered and washed to obtain $MnO_2$ decorated SWCNT. FIG. 14 shows TEM images of $MnO_2$ decorated SWCNT, wherein the $MnO_2$ nanoparticles bound to the surface of the SWCNT have an average size of between about 1 to 10 nm. The images provided in FIG. 14 show the same structure but the magnification is different. FIG. 20 shows cyclic voltammograms for supercapacitors with CNT and $MnO_2$ decorated CNT electrode measured at 20 $mVs^{-1}$, which the $MnO_2$ decorated CNT has a slightly higher capacitance of 105 F/g as compared to CNT electrode (~90 F/g).

1.6 Synthesis of TiO$_2$ Nanotubes

Figure 6:
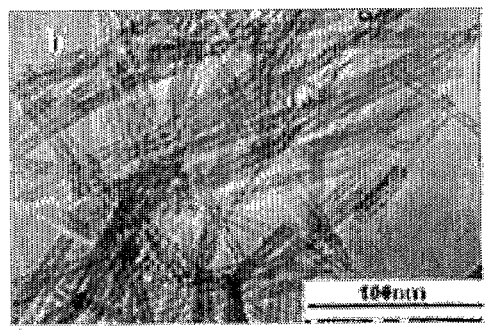
FIG. 6 shows a TEM image of TiO$_2$ nanotubes obtained by a method described herein and used for decoration with metal nanoparticles as described herein. Scale bar 100 nm.

Titania (TiO$_2$) powder 0.5-1.0 g was added to a 15 M solution of sodium hydroxide and stirred vigorously for 2 h. Then the contents were transferred in to a Teflon® lined stainless steel autoclave which was placed in the oven for 4-5 days at 170° C. The resultant dispersion was washed several times with 0.1 mol/L HNO$_3$ till the pH is 7 and then dried in the oven at 80° C. for 24 h. Nanotubes obtained by this method are illustrated in the TEM image of FIG. 6. Using the above methods the TiO$_2$ nanotubes can be decorated with metal nanoparticles.

1.7 Preparation of Supercapacitor Electrodes

In the following the general suitability of the metal decorated nanostructured material as electrode material is demonstrated based on the manufacture of an electrode material for a supercapacitor.

For preparing supercapacitor electrodes, a SWCNT, Ag-decorated SWCNT or MnO$_2$-decorated SWCNT suspension (0.2 mg/ml in deionized water) was filtered through a filter membrane (Whatman, 20 nm pore size, 47 mm diameter). The CNT were trapped on the surface of the filter, forming an interconnected network. After drying, the freestanding CNT network was peeled off from the filter (thickness about 20 μm) and used as the electrode. For comparison purpose, a thin film electrode consisting of 2 wt % Ag powder (Sigma-Aldrich, 2-3.5 μm) and SWCNT by mechanically mixing them in deionized water (0.2 mg/ml) and filtering through a membrane was also prepared.

1.8 Fabrication of Polymer Electrolyte and Assembly of Supercapacitor

The acidic polymer electrolyte was prepared by heating 5 g of PVA monomer powder (Alfa Aesar, 98-99% hydrolyzed, medium/high molecular weight) in 50 ml deionized water at 90° C. until a clear gel-like solution was obtained. Subsequently, a 3 ml of H$_3$PO$_4$ (Sigma-Aldrich, 85% purity) was added into this solution subjected to continuous stirring. Air bubbles in the gel-like solution were removed using vacuum desiccators, and this solution was heated to 60° C. for 4 h to remove excess water, and form a 0.5 mm film of polymer electrolyte. This was stacked in between two strips of Ag-CNT or MnO$_2$-CNT network (FIG. 4*a*), which were secured on to a polyethylene terephthalate (PET) substrate using double-sided adhesive tape. The polymer electrolyte also acts as the separator between the two electrodes, preventing electrical short-circuit but allowing ionic charge transfer to take place.

1.9 Structural and Electrochemical Characterization

Silver in the Ag-CNTs was characterized from X-ray diffraction (XRD) patterns collected using a Shimadzu diffractometer (CuKα) by step scanning (0.02°, 0.6 s dwell time) over 10° to 140° 2θ range. Transmission electron microscopy (TEM) operating in high resolution mode was conducted using JEOL 2100F operating at a voltage of 200 kV. Capacitance was measured using a two electrode configuration. Cyclic voltammetry and galvanostatic charge/discharge cycle test was carried out using a computer controlled bipotentiostat (Pine Instrument, AFBP1) in the potential range of 0-1 V at scan rate of 20 mVs$^{-1}$ and at the constant current (0.4 to 1 mA), respectively. AC impedance was measured using an impedance spectrum analyzer (Solatron, SI 1255 Impedance/gain-phase analyzer; computer software ZView) at room temperature with AC amplitude of 5 mV, from 55 kHz to 1 mHz at open circuit potential (OCP).

1.10 Optimization of Synthesis Condition for Decoration of Nanostructured Material The findings have shown that pH, reaction time and AgNO$_3$ concentration are the main parameters controlling the dispersion and size of AgNP on SWCNT. After introduction of SWCNTs to 0.15 M AgNO$_3$ solution, the pH decreases from 5.6 to 3.4 as shown in Table 2 due to the presence of the acidic carboxyl groups on the nanotubes.

TABLE 2

Silver nanoparticle characteristics as a function of pH and reaction time for metal decorating single-walled carbon nanotube

| Sample | AgNO$_3$ conc. (M) | pHs[a] | pHsc[b] | pHn[c] | rxn. time (min) | average Ag crystal size[d] (nm) |
|---|---|---|---|---|---|---|
| AgCNT1 | 0.15 | 5.6 | 3.4 | 4.3 | 120 | 15 |
| AgCNT2 | 0.05 | 5.6 | 3.4 | 6.3 | 15 | 1 |
| AgCNT3 | 0.10 | 5.6 | 3.4 | 6.3 | 15 | 3 |
| AgCNT5 | 0.15 | 5.6 | 3.4 | 6.3 | 60 | 4 |
| AgCNT6 | 0.15 | 5.6 | 3.4 | 6.3 | 120 | 6 |
| AgCNT7 | 0.15 | 5.6 | 3.4 | 7.3 | 120 | 10 |

Figure 8:
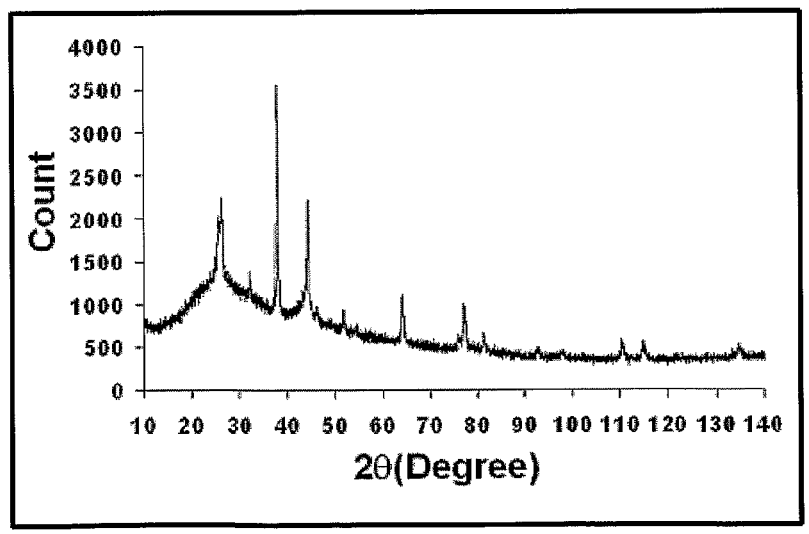
FIG. 8 is a XRD plot showing the metallic silver reflections of AgCNT6.

[a] pH of AgNO$_3$ solution.
[b] pH of AgNO$_3$ after added SWCNTs.
[c] pH of suspension after added NaOH.
[d] Determined by TEM. rxn. time = incubation time Subsequently, the absorption of AgNO$_3$ with these groups on the CNT forms COO—Ag groups (FIG. 2). The addition of NaOH solution is a critical step in controlling pH to ensure that the quantity of hydroxyl ions is sufficient for the progressively reduction of Ag$^I$ to Ag$^0$. Table 2 shows the silver nanoparticle size of three different samples as a function of pH and reaction time. At pH 4.3 (after added NaOH), the Ag nanoparticle size decorated on SWCNTs was the largest with the diameter about 15 nm (FIG. 3*a*). As the pH increases to 6.3, the Ag nanoparticles size dramatically decreases to 6 nm (FIG. 3*b*) for the same reaction time. This phenomenon might be due to the reaction between excess hydroxyl ions and the COO—Ag groups at higher pH, which promotes the reformation of carboxyl groups on SWCNTs with concomitant release of Ag—OH. Consequently, the number of available nucleation sites and the growth of Ag nanoparticles decrease. By the reducing of aging time from 120 min to 15 min (at the same pH condition), the size of the Ag nanoparticles decreases from 6 nm to 3 nm (FIGS. 3*b* and 3*c*). This indicates that longer reaction time actually yielded larger Ag nanoparticles through the crystal growth and aggregation after nucleation. The variation of AgNO$_3$ concentrations (0.05-0.15 M, pH 6, aging time 15 min) was studied to optimize the condition which the colloidal Ag cluster formation can be prevented. At the excess Ag precursor than required for nucleation and growth (0.15 M), the mixture of large colloidal Ag clusters (20-100 nm, FIG. 7*a*) and Ag decorated on SWCNTs (3 nm) were formed. The absence of Ag clusters with constant size of Ag on SWCNTs as 0.15 M condition was obtained when reduced the AgNO$_3$ concentration to 0.10 M. The lower dispersion and smaller silver crystal size, 1 nm, on SWCNT surfaces (FIG. 7*b*) were achieved at 0.05 M AgNO$_3$ solution. XRD pattern (FIG. 8) confirms the formation of cubic Ag$^0$ at 2θ=38, 45, 64, 78, and 82.

1.11 Supercapacitor Electrochemical Device Testing

Figure 4:
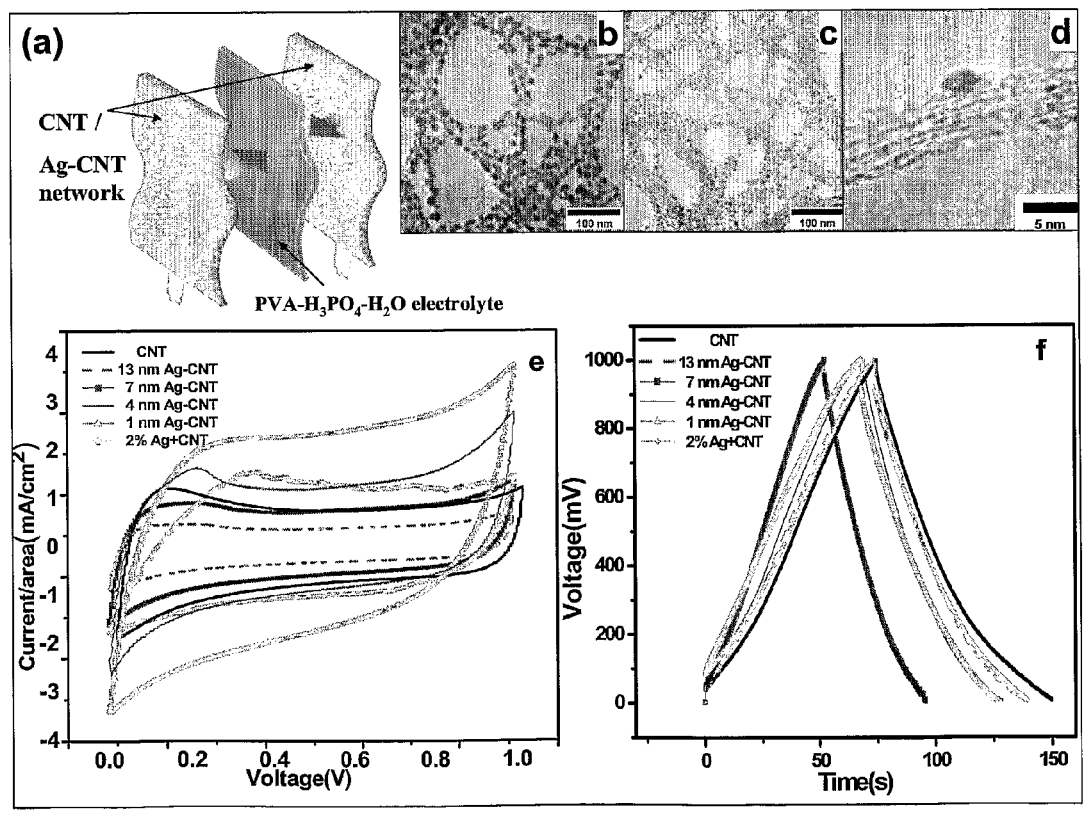

Cyclic voltammograms for six supercapacitor device types with following electrode materials: reference device with CNT electrode, Ag-decorated CNT for four different AgNP size ranges: 13±2 nm, 7±1 nm, 4±1 nm, and 1 nm (1-2 nm size range), and the 2 wt % Ag powder—CNT mixture (2% Ag+CNT) are presented in FIG. 4*e*. The specific capacitance of all the devices as determined using both cyclic voltammetry (CV; FIG. 4*e*) and galvanostatic charge and discharge (GCD; FIG. 4*f*) methods, ranged from 0.03-0.24 F/cm$^2$ with the reference CNT devices showing good agreement with literature values. Specific capacitance was normalized with area rather than the mass per electrode as unlike liquid electrolytes, polymer electrolyte only wets the surface of the electrode and hence only the surface rather than the entire mass of Ag-CNT electrode would contribute to the formation of the electrical double layer. The specific capacitance of a dense CNT network is 0.09 F/cm$^2$ and its CV curve shows the peak at 0.2 V, which can be attributed to oxygen containing functional groups contributing as pseudocapacitance to the overall capacitance. Functional groups, surfactants, and impurities contributed by the CNT synthesis and device fabrication process, internal and external device resistance resulting from unoptimized device construction and external device contacts are thought to lead to the deviations from the box-shaped CV characteristics of an ideal supercapacitor.

less likely to block the mesopores of the carbon nanotubes and may also increase the effective surface area aided by the cluster of Ag atoms that create small protrusions on the CNT surface. A 1 nm AgNP is estimated to consist of about 31 Ag atoms, which may result in an increased effective surface area that may contribute to enhanced capacitances observed for the 1 nm Ag-CNT and the 4 nm Ag-CNT devices.

The role of Ag in contributing to the pseudocapacitance was further investigated by studying devices in which the electrode is prepared by physically mixing 2 wt % of Ag particles into the CNT, denoted as 2% Ag+CNT device. The recorded capacitance, 0.12 F/cm$^2$, was higher than that for the reference CNT, 13 nm Ag-CNT, and 7 nm Ag-CNT devices (>5 nm AgNP), but lower than the 4 nm Ag-CNT and 1 nm Ag-CNT devices (<5 nm AgNP). The capacitance of this 2%

TABLE 3

Specific capacitance, internal resistance and sheet resistance measured for all devices using both CV and GCD methods.

| Sample | Area per electrode (cm$^2$) | Mass per electrode (mg) | C (F/cm$^2$) CV | C (F/cm$^2$) Galv | C (F/g) CV | C (F/g) Galv | Energy density (Wh/kg) | Power density (kW/kg) | R (ohm) | Sheet Resistance ($\Omega$ cm$^{-2}$) |
|---|---|---|---|---|---|---|---|---|---|---|
| P3CNT | 0.56 | 1.10 | 0.09 | 0.082 | 46.5 | 41.9 | 1.5 | 2.7 | 83.19 | 15.74 |
| 13 nm-AgCNT | 0.60 | 1.20 | 0.046 | 0.033 | 22.8 | 16.5 | 0.7 | 1.3 | 159.92 | 10.26 |
| 7 nm-AgCNT | 0.70 | 1.40 | 0.087 | 0.060 | 43.4 | 28.3 | 1.2 | 2.4 | 72.83 | 5.91 |
| 4 nm-AgCNT | 0.54 | 1.23 | 0.15 | 0.100 | 67.5 | 44.8 | 1.9 | 3.1 | 65.49 | 6.34 |
| 1 nm-AgCNT | 0.52 | 1.22 | 0.244 | 0.206 | 105.8 | 89.4 | 3.3 | 2.5 | 83.00 | 10.20 |
| 2% Ag + CNT | 0.54 | 1.65 | 0.120 | 0.120 | 39.3 | 39.0 | 1.4 | 1.1 | 140.79 | 5.08 |

Figure 9:
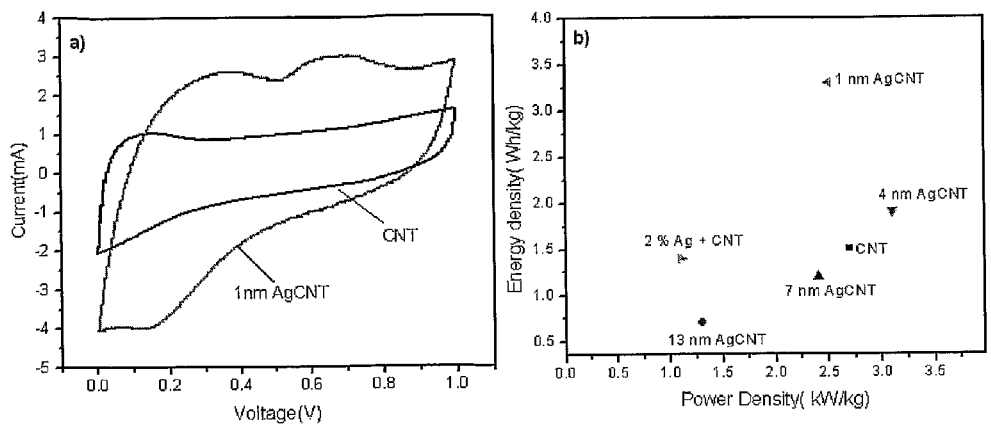
FIG. 9(a) Cyclic voltammograms for 1 nm Ag-CNT and CNT devices which clearly shows redox peaks observed for 1 nm Ag-CNT in 1 M H$_3$PO$_4$ liquid electrolyte and FIG. 9(b) shows the energy density and power density plots for all supercapacitor devices referred to in the experimental section.

In comparison, redox peaks at V=0 and 1 V can be observed for 1 nm Ag-CNT and 4 nm Ag-CNT, which also exhibit significantly larger specific capacitances of 0.24 F/cm$^2$ and 0.15 F/cm$^2$, respectively. These redox peaks are seen more clearly by using 1 M H$_3$PO$_4$ liquid electrolyte, due to the higher mobility of ions contained in the liquid electrolyte as compared to the solid-state aqueous electrolyte (FIG. 9a). The appearance of the redox peaks strongly suggests that the mechanism in enhancing the capacitance in the 1 nm Ag-CNT and 4 nm Ag-CNT devices may be attributed to the fact that the Ag-NPs participate as Faradaic reversible redox sites leading to a pseudocapacitance contribution to the overall specific capacitance. Thus the overall specific capacitance may be viewed as a combined contribution of an electrical double layer capacitance and a pseudocapacitance; the former influenced strongly by the surface area whereas the latter influenced by the presence of Ag.

The specific capacitance (shown as energy and power density in FIG. 9b) of supercapacitors decreases with increasing particle sizes with 4 nm Ag-CNT, 7 nm Ag-CNT, and 13 nm Ag-CNT devices yielding values of 0.15 F/cm$^2$, 0.09 F/cm$^2$, and 0.05 F/cm$^2$ respectively. Similar observations were also obtained from the measurement of specific capacitance using galvanostatic charge and discharge method, with the capacitance values (Table 3) mirroring the cyclic voltammetry results.

The decrease in the specific capacitance of the devices with larger AgNPs (e.g. 7 nm Ag-CNT and 13 nm Ag-CNT devices) may be attributed to the pore blockage of CNT by larger AgNP, resulting in a reduction of the effective surface area and thus reducing the electrical double layer capacitance. On the other hand, smaller AgNP (with diameter <5 nm) are Ag+CNT device is higher than the reference CNT device suggesting that the Ag particles did not block the CNT surface and that the Ag did contribute through its pseudopacitance. The observations detailed in the preceding paragraphs thus may be summarized as follows: specific capacitance in Ag-CNT supercapacitors comprises of contributions from the electrical double layer capacitance and from pseudocapacitance; with the former governed primarily by surface area whereas the latter influenced strongly by the size of the AgNPs. Smaller AgNPs do not decrease the overall surface area; whereas they enhance the pseudocapacitance thus resulting in a specific capacitance enhancement of up to about 150% for 1 nm Ag-CNT over the reference CNT devices.

1.12 Supercapacitor Impedance Testing

Low internal resistance is of critical importance in supercapacitors, since it is one of the limiting factors for power density ($P=V^2/4R$) and also influences the charge-discharge cycles. In supercapacitors, a number of sources contribute to the internal resistance and are collectively measured and referred to as the equivalent series resistance, or ESR. Contributors to the ESR of supercapacitors include sheet resistance of the electrode, interfacial resistance between the electrode and the electrolyte, ionic resistance of the electrolyte, and the external lead contact resistance. The sheet resistance, as measured at several points on the network using a probe station, decreases from 15.74 $\Omega$cm$^{-2}$ for the reference CNT device to 10.20 $\Omega$cm$^{-2}$ and 6.34 $\Omega$cm$^{-2}$ for devices comprising 1 nm and 4 nm AgNP, respectively. As expected, adding the AgNP into CNT network does lead to a reduction in the sheet resistance, presumably due to the reduction in the intertube resistance; however, this trend reverses with increasing AgNP particle sizes, with the 7 nm Ag-CNT and 13 nm Ag-CNT devices showing resistances of 6.34 $\Omega cm^{-2}$ to 10.26 $\Omega cm^{-2}$, respectively.

Figure 10:
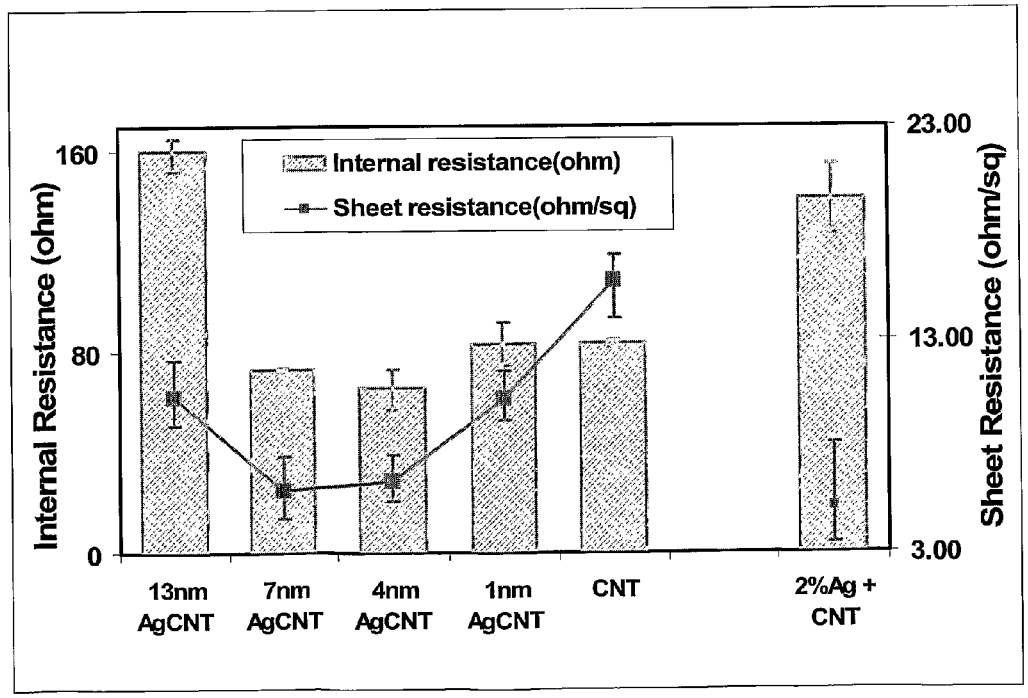
FIG. 10 is a bar chart which shows the internal resistance and sheet resistance measured for the supercapacitor devices already referred to in FIG. 4.

These observations are further confirmed by the internal resistance measurements obtained from the galvanostatic charge and discharge test (FIG. 4f). From the voltage (IR) drop at the beginning of the discharge curve, the internal resistances for the CNT electrode was found to be 83.2$\Omega$. Incorporation of AgNP into the CNT network yields internal resistances of 83$\Omega$ and 65$\Omega$ for 1 nm Ag-CNT and 4 nm Ag-CNT; however, the 7 nm Ag-CNT, 13 nm Ag-CNT, and 2% Ag+CNT devices display internal resistances of 68$\Omega$, 160$\Omega$, and 141$\Omega$, respectively, which is similar to the observations from sheet resistance measurement. The result of both internal resistance and sheet resistance of the electrode are represented by the bar chart (FIG. 10) for giving a clearer overview on the correlation between AgNP sizes and both the internal resistance and sheet resistance of the devices.

Figure 11:
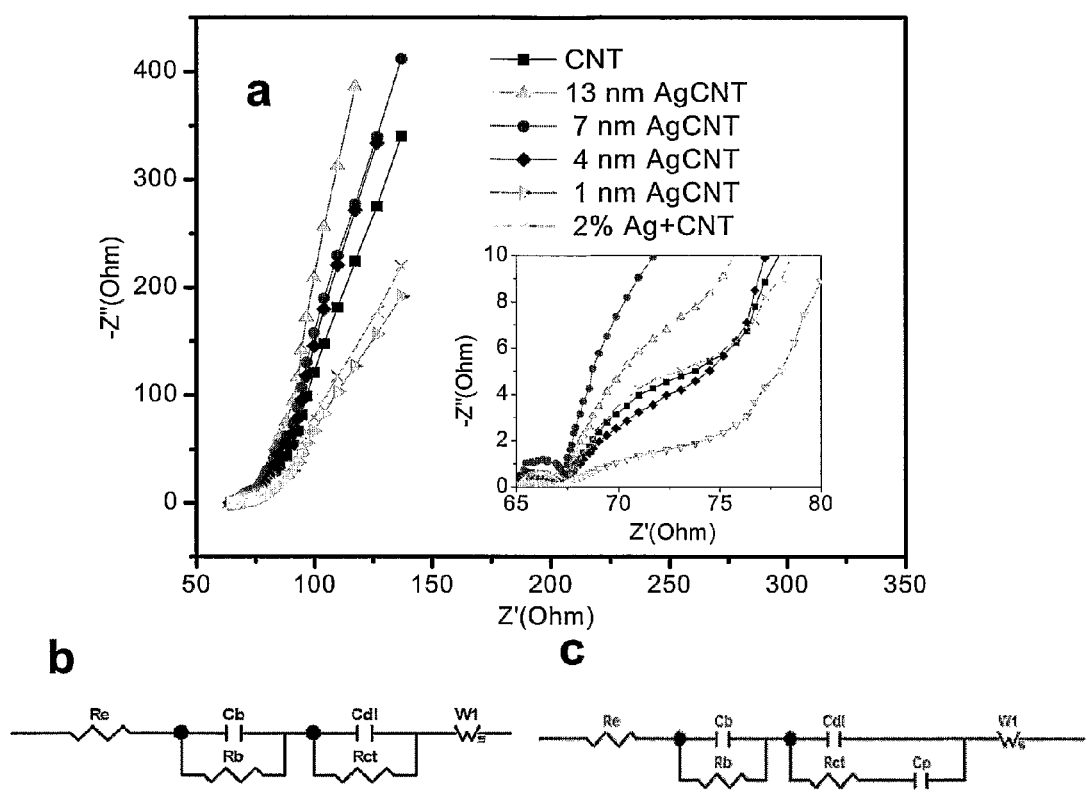
FIG. 11(a) shows Nyquist impedance plots. The inset in FIG. 11(a) shows the high frequency, low impedance region. (b) Equivalent circuit model for CNT, 13 nm Ag-CNT, 7 nm Ag-CNT and 2% Ag-CNT devices. (c) Equivalent circuit model for 4 nm Ag-CNT and 1 nm Ag-CNT devices.

The effect of AgNP on supercapacitor performance and the electrochemical behavior of Ag-CNT electrodes was further investigated with AC impedance spectroscopy (FIG. 11a). An intersection occurs in the real axis in the high frequency region, followed by a single quasi-semicircle in low frequency region. This semicircle in the high frequency region can be attributed to (1) the presence of an interface between the electrode and the electrolyte, and (2) the presence of a RC loop involving a double-layer capacitance in parallel with a resistance. At low frequency, the plot transforms to an almost vertical line, corresponding to the capacitive response of porous carbons. The non-vertical slope of the impedance plot at low frequency of supercapacitor may be ascribed to different pore size distribution carbons, and low mobility of ions inside the electrodes. An equivalent circuit for Ag-CNT electrodes would involve the following circuit elements: the bulk solution resistance, $R_e$; the double layer capacitance, $C_{dl}$; the interfacial charge transfer resistance, $R_{ct}$, and the Warburg impedance due to distributed resistance within the mesopores, $W_s$. Since both active material and current collector was combined into a single component in the devices, $C_b$ and $R_b$ correspond to the capacitance and resistance within the electrode. For 1 nm Ag-CNT and 4 nm Ag-CNT particularly, an additional element of $C_p$, corresponding to pseudocapacitance needed to be included in the equivalent circuit. The combination of the circuit elements are proposed and shown in FIGS. 11b and 11c, respectively. Accordingly, the overall impedance, Z, of the equivalent circuit for CNT, 13 nm Ag-CNT, 7 nm Ag-CNT and 2% Ag-CNT devices without the presence of pseudocapacitance is given by:

$$Z = R_s + \frac{R_b}{j\omega R_b C_b + 1} + \frac{R_{ct}}{j\omega R_{ct} C_{dl} + 1} \quad (1)$$

As for 4 nm Ag-CNT and 1 nm Ag-CNT devices with an additional element of pseudocapacitance, the equation of the impedance, Z is expressed as:

$$Z = R_s + \frac{R_b}{j\omega R_b C_b + 1} + \frac{1}{j\omega C_{dl} + \frac{j\omega C_p}{j\omega R_{ct} C_p + 1}} \quad (2)$$

Equation (1) and (2) together with the impedance data in FIG. 11a were employed to estimate the values of the elements of the equivalent circuit in FIGS. 11b and 11c. The estimated values are summarized (Table 4).

TABLE 4

Components of the equipment circuit fitted for the impedance spectra

| Sample | $R_b$ ($\Omega$) | $R_{ct}$ ($\Omega$) | $c_b$ ($\mu F\ cm^{-2}$) | $c_{dl}$ ($Fcm^{-2}$) | $C_{dl} + C_p$ ($Fcm^{-2}$) |
|---|---|---|---|---|---|
| CNT | 1.511 | 28.13 | 18.252 | 0.03 | — |
| 13 nm Ag-CNT | 0.84 | 87.24 | 46.883 | 0.017 | — |
| 7 nm Ag-CNT | 2.301 | 47.8 | 13.611 | 0.01 | — |
| 4 nm Ag-CNT | 0.945 | 3.773 | 18.699 | — | 0.054 |
| 1 nm Ag-CNT | 0.467 | 1.38 | 50.409 | — | 0.117 |
| 2% Ag-CNT | 0.61 | 26.38 | 36.515 | 0.035 | — |

The electrolyte resistance was approximately 65$\Omega$ this relatively higher value as compared to the liquid electrolyte (<10$\Omega$) is mainly due to the lower mobility of ions within the polymer electrolyte. The $R_{ct}$ value for each Ag-CNT electrode accounts for a major proportion of the overall resistance, whereas the $R_b$ plays a minor role. The charge transfer resistance, $R_{ct}$, decreases as the AgNP sizes become smaller, and a significant decrease is observed for 4 nm Ag-CNT and 1 nm Ag-CNT devices, with $R_{ct}$ in the range of 1-4$\Omega$ (Table 4). This observation indicates that AgNP in the size range of 1-5 nm effectively reduce the resistance between the CNT electrode and the electrolyte; whereas, larger AgNPs (>7 nm) possibly reduce the electrochemical redox kinetics by blocking the pores on the CNT surfaces, yielding $R_{ct}$ values of 87$\Omega$ for 13 nm Ag-CNT device; significantly higher even than the reference CNT device (about 28$\Omega$).

The double layer capacitance, $C_{dl}$, obtained from impedance analysis increases as AgNP reduces from 7 to 1 nm, which is analogous to the observation from CV measurement. The pseudocapacitance, $C_p$, for 4 nm Ag-CNT and 1 nm Ag-CNT devices contributed to the overall capacitance as $C_{dl}+C_p$. Again, 1 nm Ag-CNT has the highest capacitance among all the devices, further supporting the findings from CV measurements, which indicate that pseudocapacitance is an important contributor to the enhancement of capacitance for the <5 nm AgNP devices. The values of $R_b$ and $C_b$ (contribution from the electrodes) were negligibly small compared to the overall resistances and capacitances (Table 4).

Figure 12:
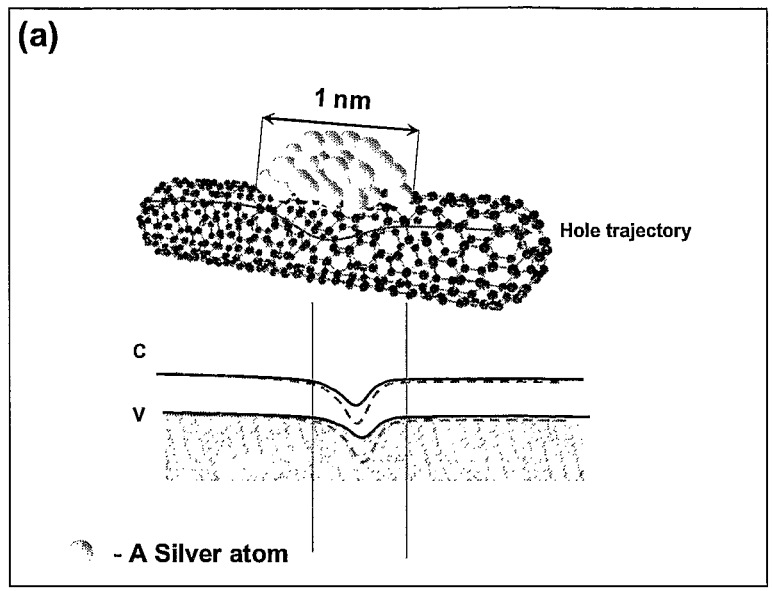
FIG. 12(a) is an illustration of a 1 nm silver particle bound (decorated) on top of the surface of a nanostructured material, such as CNT, and the proposed corresponding energy diagrams illustrating the potential barrier within the tube (intra-tube resistance), which is deeper for larger metal nanoparticles or metal oxide nanoparticles, such as AgNP (>20 mu AgNP, dotted line) decorated CNT as compared to smaller metal nanoparticles or metal oxide nanoparticles, such as AgNP (<5 nm, solid line).
FIG. 12(b) shows an energy diagram of a metallic and semiconducting CNT junction leading to formation of a Schottky barrier; and a NP mediated reduction in the barrier height leading to improved charge transport (lower inter-tube resistance) between the metallic and semiconducting nanotubes.
Figure 12:
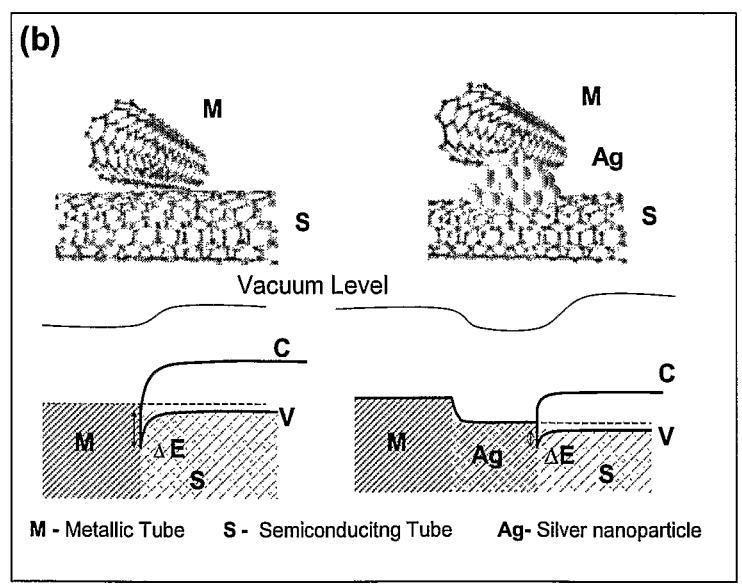

Fermi level alignment is expected to occur whenever a contact is formed between a metal and a semiconductor resulting in charge redistribution and the formation of a depletion layer surrounding the metal. The Ag-decorated CNTs will also experience such an effect and create a localized depletion region, acting as a charge scattering site and creating a potential barrier within the nanotube, leading to a decrease, in mobility and intra-tube conductivity (FIG. 12(a)). It may be argued that the depth of the depletion region (and potential barrier) increases with the number of atoms in the nanocluster, reaching a maximum value somewhere in the 5-20 nm range, beyond which this depth may remain constant; the width however increasing with increasing coverage of the Ag nanoparticles. The contact resistance between metallic-metallic and semiconducting-semiconducting tubes is known to be negligible. On the other hand, the significant inter-tube contact resistance between semiconducting-metallic CNTs has been attributed to the creation of a Schottky barrier. The semiconducting-metallic CNT junction mediated with Ag nanoparticles on the other hand leads to a reduction in the Schottky barrier thus reducing the inter-tube contact resistance (FIG. 12(b)).

The observations of increased sheet resistance and internal resistance can now be discussed in the context of the effect of Ag on the intra-tube as well as the inter-tube resistances. One may argue that the intra-tube resistance with 13 nm AgNP is probably highest amongst all the AgNP sizes evaluated in this study, 1 nm to 13 nm. The inter-tube resistance on the other hand is probably highest for the 1 nm AgNP device owing to the Ag coverage on the CNT surface. Adding AgNP to CNT leads to a reduction in sheet resistance from about 15 $\Omega cm^{-2}$ for the reference device to about 10 $\Omega cm^{-2}$ (13 nm AgNP), about 6 $\Omega cm^{-2}$ (7 and 4 nm AgNP), and about 10 $\Omega cm^{-2}$ (1 nm AgNP) with decreasing Ag sizes. The reduction in sheet resistance for the 13 nm and 7 nm device may be attributed to improved inter-tube contact whereas for the smaller AgNP devices, the probability of a Ag mediated CNT-CNT contact has reduced due to the reduced size/surface coverage of Ag on the CNTs and therefore, the sheet resistance for the 1 nm AgNP-CNT increases slightly to about 10 $\Omega cm^{-2}$ which is still lower than the reference (about 15 $\Omega cm^{-2}$). The sheet resistance for 2% Ag-CNT device is the lowest at 5 $\Omega cm^{-2}$ arguably due to large silver clusters and possible percolation paths within the 2-5 μm silver particles. The response of the internal resistance on the other hand comprehends electrolyte effects in addition to the inter and intra-tube contact resistance issues and although does show some AgNP dependence, it is best compared with the EIS; and previously described, the ionic diffusion resistance resulted from the pore blockage by large AgNP results in high internal resistances of 160$\Omega$ and 141$\Omega$ for the 13 nm AgNP and the 2% Ag+CNT device, respectively.

Thus, it can be the in summary that a metal-decorated nanostructured material has been demonstrated to be an effective charge collector and electrode material for supercapacitors. Capacitance per area of the device can be increased by decorating nanostructured material with metal nanoparticles or metal oxide nanoparticles of size smaller than about 5 nm which will not block the mesopores of the nanostructured material and complement the double layer capacitance by a Faradaic reaction induced pseudocapacitance. The internal resistance of the device can also be reduced by adding nanoparticles with size ranging from 3-8 nm. The presence of AgNP can help in reducing the inter-tube contact resistance of the CNT and leading to a decrease in the overall internal resistance of the device, which is important in improving the power density.

The invention claimed is:

1. A network of individual nanostructures forming a nanostructured material, the network comprising nanoparticles bound to surfaces of the individual nanostructures:
   wherein all nanoparticles bound to the surfaces of the individual nanostructures have a maximal dimension of about 20 nm;
   wherein each of the individual nanostructures comprises mesopores having a maximal dimension of between about 2 nm to about 50 nm on the surface of each of the individual nanostructures; and
   wherein the nanoparticles are selected from the group consisting of noble metal nanoparticles, metal oxide nanoparticles and mixtures thereof.

2. The network according to claim 1, wherein the noble metal is selected from the group consisting of silver, palladium, gold, platinum, mixtures and alloys thereof.

3. The network according to claim 1, wherein the metal oxide is selected from the group consisting of transition metal oxides and aluminium oxide.

4. The network according to claim 3, wherein the metal oxide is selected from the group consisting of $PtO_2$, $V_2O_3$, $V_2O_5$, $Nb_2O_5$, $NiO_2 \cdot xH_2O$, $LiCoO_2$, $LiFeO_2$, $LiMn_2O_3$, $Li_2MoO_4$, $Li_2TiO_3$, $MnO_2$, Ag—$MnO_2$, $Al_2O_3$, $MoO_3$, $TiO_2$, $SiO_2$, $ZnO_2$, $SnO_2$, $Fe_2O_3$, NiO, $CO_3O_4$, COO, $Nb_2O_5$, $W_2O_3$, mixtures and alloys thereof.

5. The network according to claim 1, wherein the maximal dimension of the particles is between about 0.5 to 20 nm.

6. The network according to claim 5, wherein the nanoparticle size distribution for nanoparticles with a size of between about ≥12 to 20 nm is about ±5; wherein the nanoparticle size distribution for nanoparticles with a size of between about ≥5 to <12 nm is about ±3 nm and wherein the nanoparticle size distribution for nanoparticles with a size of between about 2 to <5 nm is about ±1 nm.

7. The network according to claim 1, wherein the nanoparticles are chemically bound to the surfaces of the individual nanostructures.

8. The network according to claim 7, wherein the nanoparticles are chemically bound to the surfaces of the individual nanostructures via linkers bound at the surfaces of the individual nanostructures.

9. The network according to claim 8, wherein the linker is selected from the group consisting of molecules comprising a hydroxyl group, pyrenes, esters, thiols, amines, a carboxyl group and mixtures thereof.

10. The network according to claim 9, wherein the carboxyl group is comprised in a molecule selected from the group consisting of formic acid, acetic acid, propionic acid, butanoic acid, pentanoic acid, hexanoic acid, cycloalkane carboxylic acids, and benzoic acids.

11. The network according to claim 9, wherein the linker is a molecule which comprises phosphoric acid or sulfonic acid.

12. The network according to claim 1, wherein between about 5 and about 80% of the surface area of the nanostructured material is covered with the nanoparticles.

13. The network according to claim 1, wherein the nanoparticles are evenly distributed on the surface of the nanostructured material.

14. The network according to claim 1, wherein the individual nanostructures are selected from the group consisting of nanotubes, nanoflowers, nanowires (also called nanofibers), nanoflakes, nanoparticles, nanodiscs, nanofilms and combinations of the aforementioned individual nanostructures in a mixture.

15. The network according to claim 14, wherein the nanotubes are single-walled or double-walled or multi-walled nanotubes.

16. The network according to claim 14, wherein the nanotubes are based on carbon or metal-oxides.

17. The network according to claim 1, wherein at least one dimension of the nanostructured material is less than 100 nm.

18. The network according to claim 1, wherein the nanostructured material is made of a material selected from the group consisting of a carbon material, a ceramic, glass, a metal, a metal oxide, a polypyrrole and mixtures of nanostructured materials made of different of the aforementioned materials.

19. The network according to claim 18, wherein the carbon material is selected from the group consisting of activated carbon, carbon black and graphene.

20. An electrode comprising a network made of said individual nanostructures as referred to in claim 1.

21. The electrode according to claim 20, wherein the electrode is an electrode comprised in a supercapacitor; or a sensor; or a hybrid electrochemical device; or a rechargeable battery; or a metal-air battery.

22. A method of manufacturing nanoparticle decorated nanostructures, wherein the nanoparticles are selected from the group consisting of noble metal nanoparticles, metal oxide nanoparticles and mixtures thereof; wherein the method comprises:

mixing porous nanostructures comprising mesopores having a maximal dimension of between about 2 nm to about 50 nm on the surface of each of the individual nanostructures with a solution comprising a noble metal nanoparticle precursor or a metal oxide nanoparticle precursor to obtain a suspension of the individual nanostructures with the solution comprising the noble metal nanoparticle precursor or the metal oxide nanoparticle precursor; and chemically reducing the noble metal nanoparticle precursor or the metal oxide nanoparticle precursor to allow precipitation of the nanoparticles on the surfaces of the individual nanostructures at a temperature of equal or less than 80° C. to obtain a network of the individual nanostructures comprising the nanoparticles bound to the surfaces of the individual nanostructures.

23. The method of claim 22, wherein the temperature during the chemical reduction is equal or below 60° C. in case of using a noble metal nanoparticle precursor.

24. The method according to claim 22, wherein the concentration of the noble metal nanoparticle precursor or a metal oxide nanoparticle precursor in the suspension is adapted such as to form nanoparticles with a maximal dimension of about 20 nm.

25. The method according to claim 22, wherein the chemical reduction is achieved by adjusting the pH in the suspension; or by heating the suspension in a reducing atmosphere, or by using a chemical reducing agent.

26. The method according to claim 25, wherein the pH is adjusted to be in a range between about 1 to 10.

27. The method according to claim 26, wherein the pH is adjusted to be in a range of between about 4 to <7.5 in case of using a silver nanoparticle precursor.

28. The method according to claim 26, wherein the pH is adjusted to be in a range of between about 4 to 10 in case of using a gold nanoparticle precursor.

29. The method according to claim 26, wherein the pH is adjusted to be in a range of between about 4 to 9 in case of using platinum nanoparticle precursor.

30. The method according to claim 26, wherein the pH is adjusted to be in a range of between about 1 to 7 in case of using manganese nanoparticle precursor.

31. The method according to claim 22, wherein the suspension is incubated for a time between about 15 min to about 120 min.

32. The method according to claim 22, wherein the concentration of the noble metal nanoparticle precursor or a metal oxide nanoparticle precursor in the solution of a nanoparticle precursor is between about 3 mM to about 150 mM.

33. The method according to claim 22, wherein the noble metal nanoparticle precursor or metal oxide nanoparticle precursor is selected from the group consisting of metal chlorides, metal nitrates, metallic alkoxides, organometallic precursors and $KMnO_4$.

34. The method according to claim 33, wherein the noble metal nanoparticle precursor or metal oxide nanoparticle precursor is selected from the group consisting of $AgNO_3$, $[Ag(NH_3)_2]^+$ (aq), $HAuCl_4 \cdot 3H_2O$, $H_2PtCl_6 \cdot 6H_2O$, $H_2PdCl_6 \cdot 6H_2O$, $Mn(NO_3)_2$, titanium methoxide, titanium ethoxide, titanium isopropoxide, titanium propoxide, titanium butoxide, and $KMnO_4$.

35. The method according to claim 22, wherein the molar ratio of a nanoparticle precursor to nanostructures is between 0.05 to about 0.6.

36. The method according to claim 22, subjecting the individual nanostructures to a treatment before mixing it with the noble metal nanoparticle precursor or metal oxide nanoparticle precursor; wherein the treatment is an oxidative treatment or sintering at temperatures <500° C., or refluxing in inorganic polar solvents; or plasma treatment.

37. The method according to claim 22, further comprising sieving the nanoparticle decorated nanostructures through a filtration membrane to obtain a membrane comprised of the nanoparticle decorated nanostructures.

38. Nanoparticle decorated nanostructures obtained by a method according to claim 22.

39. A membrane comprised of the nanoparticle decorated nanostructures obtained by a method according to claim 37.

* * * * *